(12) United States Patent
Kikukawa et al.

(10) Patent No.: US 12,249,090 B2
(45) Date of Patent: Mar. 11, 2025

(54) INFORMATION PROCESSING DEVICE, INFORMATION PROCESSING METHOD, AND COMPUTER PROGRAM

(71) Applicant: SONY GROUP CORPORATION, Tokyo (JP)

(72) Inventors: Tetsuya Kikukawa, Tokyo (JP); Goh Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 321 days.

(21) Appl. No.: 17/792,603

(22) PCT Filed: Feb. 10, 2021

(86) PCT No.: PCT/JP2021/004866
§ 371 (c)(1),
(2) Date: Jul. 13, 2022

(87) PCT Pub. No.: WO2021/166751
PCT Pub. Date: Aug. 26, 2021

(65) Prior Publication Data
US 2023/0068299 A1 Mar. 2, 2023

(30) Foreign Application Priority Data
Feb. 19, 2020 (JP) .................................. 2020-026543

(51) Int. Cl.
*G06T 7/70* (2017.01)
*G06F 3/14* (2006.01)
(Continued)

(52) U.S. Cl.
CPC .................. *G06T 7/70* (2017.01); *G06F 3/14* (2013.01); *G06T 3/40* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 2014/0132715 A1* | 5/2014 | Raghoebardayal | ... A63F 13/212 348/43 |
| 2018/0241986 A1* | 8/2018 | Zhong | ..................... G06T 3/147 |

(Continued)

FOREIGN PATENT DOCUMENTS

| | | |
|---|---|---|
| JP | H08-069547 A | 3/1996 |
| JP | 2018-195267 A | 12/2018 |

(Continued)

OTHER PUBLICATIONS

Tomiyama et al., A Dynamic 3D, Object-Generating Algorithm from Multiple Viewpoints Using the Volume Intersection and Stereo Matching Methods, The Journal of The Institute of Image Information and Television Engineers, Jun. 1, 2004, pp. 797-806, vol. 58, No. 6.

*Primary Examiner* — Delomia L Gilliard
(74) *Attorney, Agent, or Firm* — Paratus Law Group, PLLC

(57) ABSTRACT

There is provided an information processing device, an information processing method, and a computer program capable of highly accurately designating a discretionary position in a three-dimensional model. The information processing device includes: a first display control unit that displays, on a display device, a three-dimensional model of a subject based on a plurality of captured images obtained by imaging the subject from a plurality of viewpoints; a second display control unit that displays, on the display device, a first captured image on a first viewpoint and a second captured image on a second viewpoint among the plurality of captured images; a position acquisition unit that acquires position information of a first position included in the (Continued)

subject in the first captured image and acquires position information of a second position included in the subject in the second captured image; a position calculation unit that calculates a third position included in the three-dimensional model, on the basis of information regarding the first viewpoint and the second viewpoint, position information of the first position, and position information of the second position; and a third display control unit that displays, on the display device, position information of the third position superimposed on the three-dimensional model.

14 Claims, 19 Drawing Sheets

(51) Int. Cl.
*G06T 3/40* (2024.01)
*G06T 17/00* (2006.01)

(56) References Cited

U.S. PATENT DOCUMENTS

| | | | |
|---|---|---|---|
| 2020/0027281 A1* | 1/2020 | Mukasa | G06T 19/20 |
| 2020/0082629 A1* | 3/2020 | Jones | G02B 27/0172 |
| 2021/0191600 A1* | 6/2021 | Lemay | G06F 3/0485 |
| 2023/0068299 A1* | 3/2023 | Kikukawa | G01B 11/002 |

FOREIGN PATENT DOCUMENTS

| | | |
|---|---|---|
| JP | 2019-106617 A | 6/2019 |
| WO | WO 2017/209153 A1 | 12/2017 |

\* cited by examiner

INFORMATION PROCESSING DEVICE, INFORMATION PROCESSING METHOD, AND COMPUTER PROGRAM

CROSS REFERENCE TO PRIOR APPLICATION

This application is a National Stage Patent Application of PCT International Patent Application No. PCT/JP2021/004866 (filed on Feb. 10, 2021) under 35 U.S.C. § 371, which claims priority to Japanese Patent Application No. 2020-026543 (filed on Feb. 19, 2020), which are all hereby incorporated by reference in their entirety.

TECHNICAL FIELD

The present disclosure relates to an information processing device, an information processing method, and a computer program.

BACKGROUND ART

A technique for generating a three-dimensional model of a subject on the basis of a multi-view video is known. For example, there is a technique of generating a three-dimensional model by generating a silhouette image using a difference between a foreground image and a background image, and calculating an intersection region by applying a volume intersection method to a multi-view silhouette image.

In a case where a three-dimensional model generated in this manner is displayed on a display device, the viewer (user) has a request to designate a discretionary position included in the three-dimensional model and mark the position, for example. However, in a case where the accuracy of the shape of the generated three-dimensional model is not good (for example, in a case where a part of the three-dimensional model is missing), the position of the three-dimensional model of the subject cannot be accurately designated. Furthermore, similarly in a case where the position desired to designate is hidden by a part of the body (for example, when the calf is hidden by the hand), the desired position cannot be accurately designated.

Patent Document 1 below discloses a method for generating a highly accurate three-dimensional model. However, it does not describe a method for correctly designating a desired position in a three-dimensional model in a case where a low-quality three-dimensional model is generated.

CITATION LIST

Patent Document

Patent Document 1: Japanese Patent Application Laid-Open No. 2018-195267

SUMMARY OF THE INVENTION

Problems to be Solved by the Invention

The present disclosure provides an information processing device, an information processing method, and a computer program capable of highly accurately designating a discretionary position included in a three-dimensional model.

Solutions to Problems

An information processing device of the present disclosure includes: a first display control unit that displays, on a display device, a three-dimensional model of a subject based on a plurality of captured images obtained by imaging the subject from a plurality of viewpoints; a second display control unit that displays, on the display device, a first captured image on a first viewpoint and a second captured image on a second viewpoint among the plurality of captured images; a position acquisition unit that acquires position information of a first position included in the subject in the first captured image and acquires position information of a second position included in the subject in the second captured image; a position calculation unit that calculates a third position included in the three-dimensional model, on the basis of information regarding the first viewpoint and the second viewpoint, position information of the first position, and position information of the second position; and a third display control unit that displays, on the display device, position information of the third position superimposed on the three-dimensional model.

The position calculation unit may calculate a position at which a straight line to which the first position is projected according to a line-of-sight direction of the first viewpoint and a straight line to which the second position is projected according to a line-of-sight direction of the second viewpoint intersect. The calculated position is the third position.

The position calculation unit may calculate the third position on the basis of a principle of triangulation.

The information processing device may further include an image selection unit that selects, from the plurality of captured images, captured images on two viewpoints closest to a viewpoint of a user viewing the three-dimensional model, and the second display control unit may display the first captured image and the second captured image selected by the image selection unit.

The information processing device may further include an image selection unit that selects the first captured image and the second captured image on the basis of selection information for designating the first captured image and the second captured image, and the second display control unit may display the first captured image and the second captured image selected by the image selection unit.

The information processing device may further include an instruction information acquisition unit that acquires instruction information for instructing enlargement or reduction of at least one of the first captured image and the second captured image, and the second display control unit may enlarge or reduce at least one of the first captured image and the second captured image on the basis of the instruction information.

The position acquisition unit may acquire position information of the first position from an operation device of a user in a state where the first captured image is enlarged, and acquires position information of the second position from the operation device in a state where the second captured image is enlarged.

The information processing device may further include an instruction information acquisition unit that acquires instruction information for instructing on or off of display of at least one of the first captured image and the second captured image, and the second display control unit may switch on or off of display of at least one of the first captured image and the second captured image on the basis of the instruction information.

The second display control unit may display, on the display device, position information of the first position superimposed on the first captured image, and the second display control unit may display, on the display device, position information of the second position superimposed on the second captured image.

The information processing device may further includes:

a guide information generation unit that generates guide information including a candidate for the second position on the basis of the information regarding the first viewpoint and the second viewpoint and position information of the first position; and a fourth display control unit that displays, on the display device, the guide information superimposed on the second captured image.

The guide information may be an epipolar line.

The information processing device may further include an instruction information acquisition unit that acquires instruction information for instructing movement of position information of the third position, the third display control unit may move position information of the third position on the basis of the instruction information, and the second display control unit may move position information of the first position and position information of the second position according to movement of position information of the third position.

An information processing method of the present disclosure includes:

displaying, on a display device, a three-dimensional model of a subject based on a plurality of captured images obtained by imaging the subject from a plurality of viewpoints;

displaying, on the display device, a first captured image on a first viewpoint and a second captured image on a second viewpoint among the plurality of captured images;

acquiring position information of a first position included in the subject in the first captured image, and acquiring position information of a second position included in the subject in the second captured image;

calculating a third position included in the three-dimensional model on the basis of information regarding the first viewpoint and the second viewpoint, position information of the first position, and position information of the second position; and displaying, on the display device, position information of the third position superimposed on the three-dimensional model.

A computer program according to the present disclosure causes a computer to execute a step of displaying, on a display device, a three-dimensional model of a subject based on a plurality of captured images obtained by imaging the subject from a plurality of viewpoints, a step of displaying, on the display device, a first captured image on a first viewpoint and a second captured image on a second viewpoint among the plurality of captured images, a step of acquiring position information of a first position included in the subject in the first captured image, and acquiring position information of a second position included in the subject in the second captured image, a step of calculating a third position included in the three-dimensional model on the basis of information regarding the first viewpoint and the second viewpoint, position information of the first position, and position information of the second position, and a step of displaying, on the display device, position information of the third position superimposed on the three-dimensional model.

MODE FOR CARRYING OUT THE INVENTION

Embodiments of the present disclosure will be described below with reference to the drawings. In one or more embodiments shown in the present disclosure, elements included in each embodiment can be combined with one another, and the combined resultant also makes a part of the embodiments shown in the present disclosure.

First Embodiment

Figure 1:
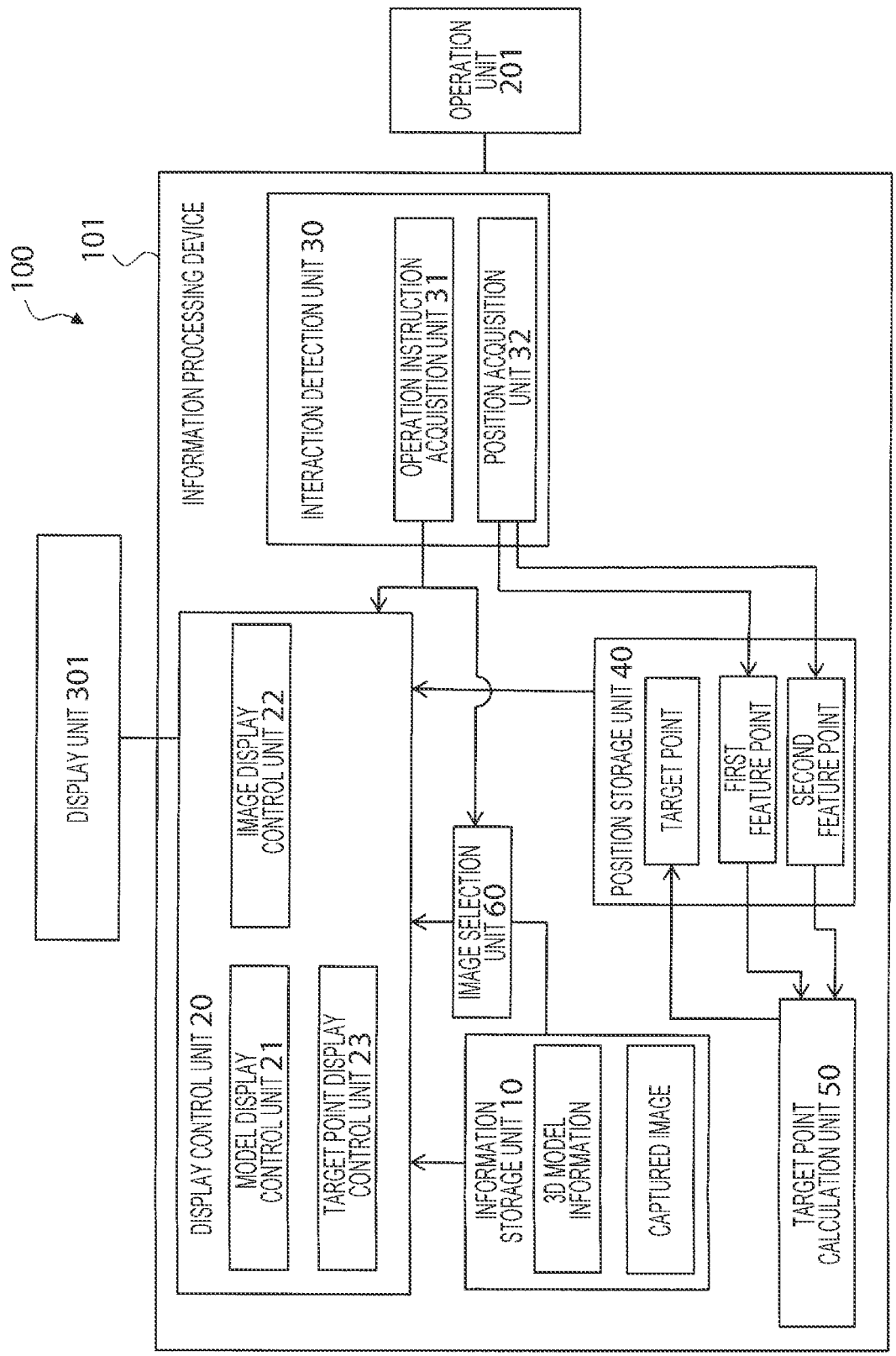
FIG. 1 is a block diagram of an information processing system including an information processing device according to a first embodiment.

FIG. 1 is a block diagram of an information processing system 100 including the information processing device 101 according to the first embodiment. An outline of the information processing system 100 in FIG. 1 will be described.

First, a problem of the present embodiment will be described. Three-dimensional model information representing a three-dimensional model of a subject is generated on the basis of a plurality of captured images (camera images) obtained by imaging the subject from a plurality of viewpoints in advance. An information processing device 101 displays, on a display unit 301, a three-dimensional image including three-dimensional model information of the subject. A user who is an operator or a viewer of the information processing device 101 has a request to designate a discretionary position (desired position) in the displayed three-dimensional model, and mark the designated position, for example. However, in a case where a part of the three-dimensional model is missing due to the accuracy of generation of the three-dimensional model, or in a case where a position desired to designate in the three-dimensional model is hidden by another part of the three-dimensional model, the user cannot accurately designate the position desired to designate. One of the features of the present embodiment is to solve this problem by the following technique.

The information processing device 101 selects and displays two captured images having different viewpoints from a plurality of captured images from which the three-dimensional model is generated. The user specifies a position (first position, second position) corresponding to a desired position in the three-dimensional model in the two captured images that are displayed, and selects the specified position as a feature point.

For example, it is assumed that the three-dimensional model represents a human, and it is desired to designate a specific position in the head of the three-dimensional model. In this case, the user specifies a position corresponding to the specific position in the head of the three-dimensional model in each of the two captured images, and selects the specified position (first position, second position) as the feature point.

The information processing device 101 performs a triangulation operation on the basis of the position information (position information of first position and position information of second position) of the selected two feature points and information (position, orientation, and the like) regarding the viewpoint of each of the two captured images. The position (third position) calculated by the triangulation operation is specified as a target point. The information processing device 101 displays the other of the target point (position information of third position) superimposed on the three-dimensional model. Therefore, the user becomes able to correctly designate a desired position in the three-dimensional model.

In the present embodiment, even in a situation where a desired position cannot be correctly designated in a three-dimensional model, if feature points corresponding to each other are correctly selected in two captured images, a position corresponding to the two feature points can be highly accurately designated as a target point by the principle of triangulation. Hereinafter, the information processing system 100 according to the present embodiment will be described in detail.

The information processing system 100 of FIG. 1 includes the information processing device 101, an operation unit 201, and the display unit 301.

The operation unit 201 is an operation device for the user to input various instructions or data. For example, the operation unit 201 is an input device such as a keyboard, a mouse, a touchscreen, or a button. The operation unit 201 may be formed in a same housing as that of the information processing device 101. For example, one smartphone, one tablet terminal, or one head mounted display may include the information processing device 101 and the operation unit 201. Alternatively, the operation unit 201 may be formed as a device independent of the housing of the information processing device 101, and may be connected to the information processing device 101 by wireless or a wired cable.

The display unit 301 is a display device that displays data, such as a liquid crystal display device, an organic EL display device, or a plasma display device. The display unit 301 is, for example, a head mounted display, a two-dimensional monitor, a three-dimensional monitor, or the like. The display unit 301 may be formed in the same housing as that of the information processing device 101. For example, one smartphone, one tablet terminal, or one head mounted display may include the information processing device 101 and the display unit 301. Alternatively, the display unit 301 may be configured as a display independent of the housing of the information processing device 101, and may be connected to the information processing device 101 by wireless or a wired cable.

The information processing device 101 includes an information storage unit 10, a display control unit 20, an interaction detection unit 30, a position storage unit 40, a target point calculation unit (triangulation operation unit) 50, and an image selection unit 60. Some or all of these elements included in the information processing device 101 are configured by hardware, software, or a combination of them. The hardware includes, as an example, a processor such as a CPU or a dedicated circuit. The information storage unit 10 and the position storage unit 40 are configured by a storage device such as a memory device or a hard disk device. The information storage unit 10 and the position storage unit 40 may be provided as an external device of the information processing device 101 or a server on a communication network. Furthermore, a clock for counting time may be provided in the information processing device 101.

The interaction detection unit 30 detects instruction information or data input by the user via the operation unit 201. The interaction detection unit 30 includes an operation instruction acquisition unit 31 and a position acquisition unit 32. The operation instruction acquisition unit 31 detects various types of instruction information to be input from the operation unit 201. The detected instruction information is output to the display control unit 20 or the image selection unit 60 according to the type of the instruction information. The position acquisition unit 32 acquires, as a feature point, a position selected by the user in the captured image from the operation unit 201, and stores, into the position storage unit 40, position information of the acquired feature point.

The information storage unit 10 stores a plurality of captured images (camera images) obtained by imaging the subject with imaging cameras corresponding to a plurality of viewpoints for a plurality of frames (a plurality of times). The plurality of captured images is frame-synchronized. Information on the imaging time may be assigned to the plurality of imaged images, and the plurality of imaged images may be frame-synchronized on the basis of the imaging time. The captured image is a color image, for example, an RGB image. The captured image for a plurality of frames on one viewpoint corresponds to a moving image on the viewpoint.

The information storage unit 10 stores three-dimensional model information representing a three-dimensional model of the subject generated by modeling based on captured images on a plurality of viewpoints. The three-dimensional model information is data representing the three-dimensional shape of the subject. In a case where M frames of the captured images described above exist for every viewpoint, M pieces of three-dimensional model information also exist similarly. However, the number of frames and the number of pieces of three-dimensional model information need not match. The three-dimensional model can be generated by a modeling technique such as a visual hull based on captured images on a plurality of viewpoints. Hereinafter, an example of generating a three-dimensional model will be described.

Camera parameters are calculated by calibration for a plurality of imaging cameras corresponding to the plurality of viewpoints in advance. The camera parameters include internal parameters and external parameters. The internal parameters are parameters unique to the imaging camera, and include, as an example, distortion of a camera lens, inclination (distortion aberration coefficient) of an image sensor and a lens, an image center, and an image size. The external parameters include the positional relationship among the plurality of imaging cameras (position and orientation of the imaging camera, and the like), the center coordinates (translation) of the lens in the world coordinate system, the direction (rotation) of the optical axis of the lens, and the like. Techniques of calibration include a Zhang's technique using a chessboard, a technique of obtaining a camera parameter by imaging a three-dimensional object, and a technique of obtaining a camera parameter by using a projection image by a projector.

The captured images corresponding to the plurality of viewpoints are corrected using the internal parameters of the plurality of imaging cameras. One of the plurality of imaging cameras is set as a standard camera, and the rest are set as reference cameras. The frame of a captured image of the reference camera is synchronized with the frame of a captured image of the standard camera.

For the plurality of captured images, a silhouette image of the subject is generated by background difference processing using a difference between a foreground image (image of the subject) and a background image. As an example, the silhouette image is represented by binarizing a silhouette indicating a range in which the captured image includes the subject.

Modeling of the subject is performed using a plurality of silhouette images and camera parameters. For modeling, for example, the visual hull technique can be used. In the visual hull technique, each silhouette image is reversely projected to an original three-dimensional space, and an intersection of volumes is obtained as a visual hull. A plurality of meshes is created by applying Marching cubes or the like to voxel data of the visual hull.

A three-dimensional position of each point (vertex) constituting a mesh and geometry information (geometry) indicating a connection (polygon) of each point are generated as three-dimensional shape data (polygon model). By configuring the three-dimensional shape data with the polygon data, it is possible to reduce the data amount as compared with the case of voxel data. The surface of the polygon may be smoothed by performing smoothing processing on the polygon model.

Texture mapping in which an image of a mesh is superimposed on each mesh of the three-dimensional shape data is performed, and the three-dimensional shape data after the texture mapping is used as three-dimensional model information representing the three-dimensional model of the subject. However, three-dimensional shape data not subjected to the texture mapping may be used as the three-dimensional model information.

The generation method of the three-dimensional model is not limited to the above-described method, and any method may be used as long as the method is generated from a plurality of captured images corresponding to a plurality of viewpoints.

The information storage unit 10 may store other information such as camera parameters in addition to the three-dimensional model information and the captured images of the plurality of viewpoints. Furthermore, data of the background image for displaying the three-dimensional model may be stored for the plurality of viewpoints.

The display control unit 20 includes a model display control unit (first display control unit) 21, an image display control unit (second display control unit) 22, and a target point display control unit (third display control unit) 23.

The model display control unit 21 reads the three-dimensional model information from the information storage unit 10 on the basis of the instruction information of the user provided from the operation instruction acquisition unit 31. The model display control unit 21 displays the three-dimensional model represented by the three-dimensional model information at a viewpoint (viewpoint at which the user views the three-dimensional model) instructed by the instruction information on the display unit 301. The viewpoint for displaying the three-dimensional model may be determined in advance. The viewpoint for viewing the three-dimensional model may be freely variable by 360 degrees in the horizontal direction, for example. A three-dimensional moving image may be reproduced by synthesizing a three-dimensional model with a background image, and displaying, in time series, a three-dimensional image including the three-dimensional model.

The model display control unit 21 may pause, fast-forward, or rewind the reproduction on the basis of the instruction information of the user in the middle of the reproduction of the three-dimensional moving image. In this case, for example, when a three-dimensional model of a frame for which a desired position in the three-dimensional model is desired to designate is displayed, the user inputs a pause instruction to display the three-dimensional model in a stationary state in the frame. Alternatively, on the basis of the instruction information of the user from the operation unit 201, the three-dimensional model information of a specific frame may be read, and the three-dimensional model represented by the three-dimensional model information may be displayed.

Figure 2:
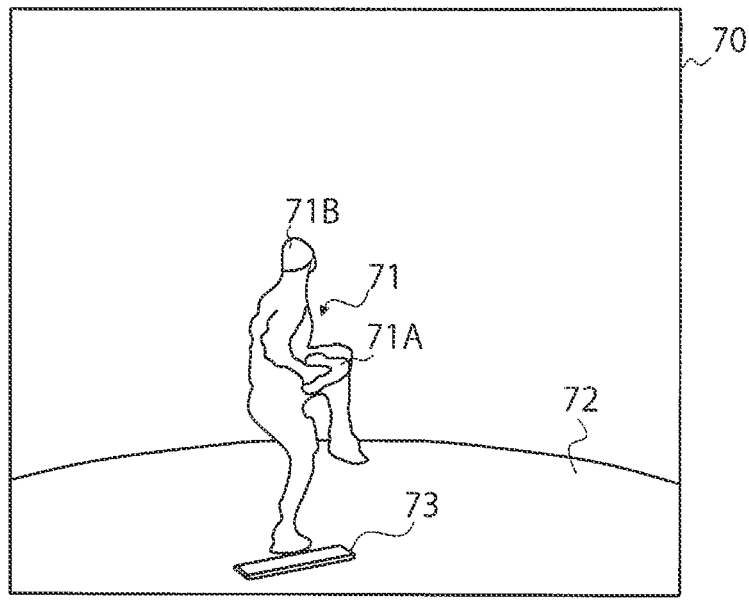
FIG. 2 is a view illustrating a display example of a three-dimensional image including a three-dimensional model in a certain frame.

FIG. 2 illustrates a display example of a three-dimensional image 70 including a three-dimensional model in a certain frame. A three-dimensional model 71 represents a baseball player. The user is trying to evaluate a pitching form of the baseball player. The background image includes a mound 72 and a pitcher's plate 73. The three-dimensional model 71 includes a glove 71A and a cap 71B.

The image selection unit 60 selects captured images of two different viewpoints from among a plurality of captured images (a plurality of frame-synchronized captured images from which the three-dimensional model is generated) corresponding to the frame of the three-dimensional image. As a method of selecting two captured images, captured images on two viewpoints closest to the viewpoint of the three-dimensional image may be selected, or captured images on two viewpoints may be discretionarily or randomly selected. Alternatively, using the operation unit 201, the user may input instruction information for selecting captured images on two viewpoints, and the image selection unit 60 may select the two captured images on the basis of this instruction information. For example, the user may select a captured image on a viewpoint in which the position desired to designate in the three-dimensional model appears most clearly.

Figure 3:
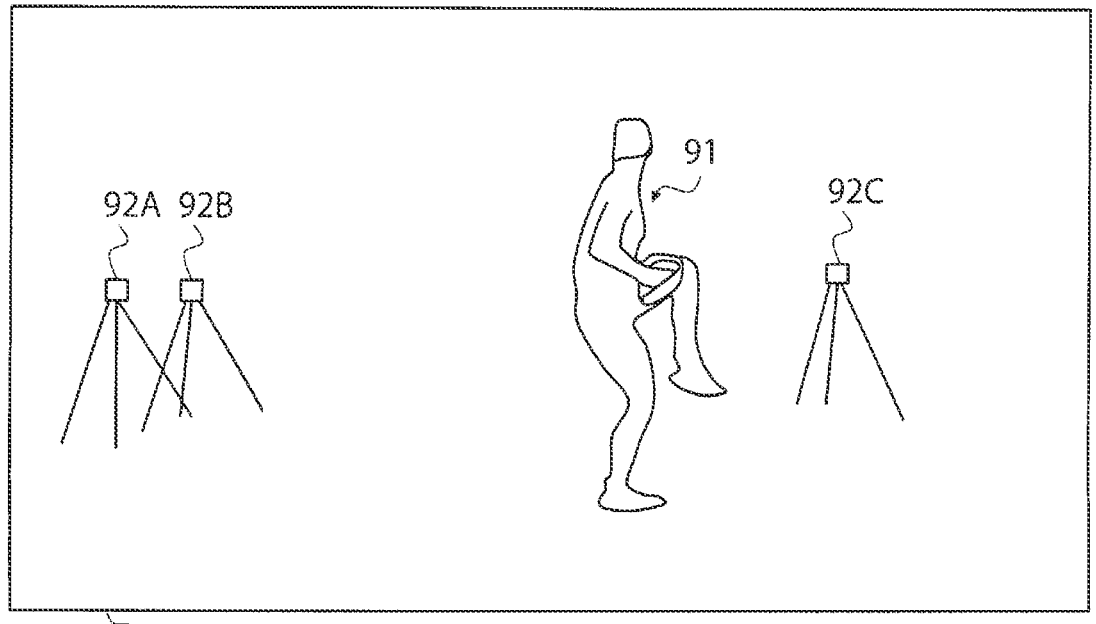
FIG. 3 is a view illustrating an example of a captured image on a certain viewpoint selected by an image selection unit.
Figure 4:
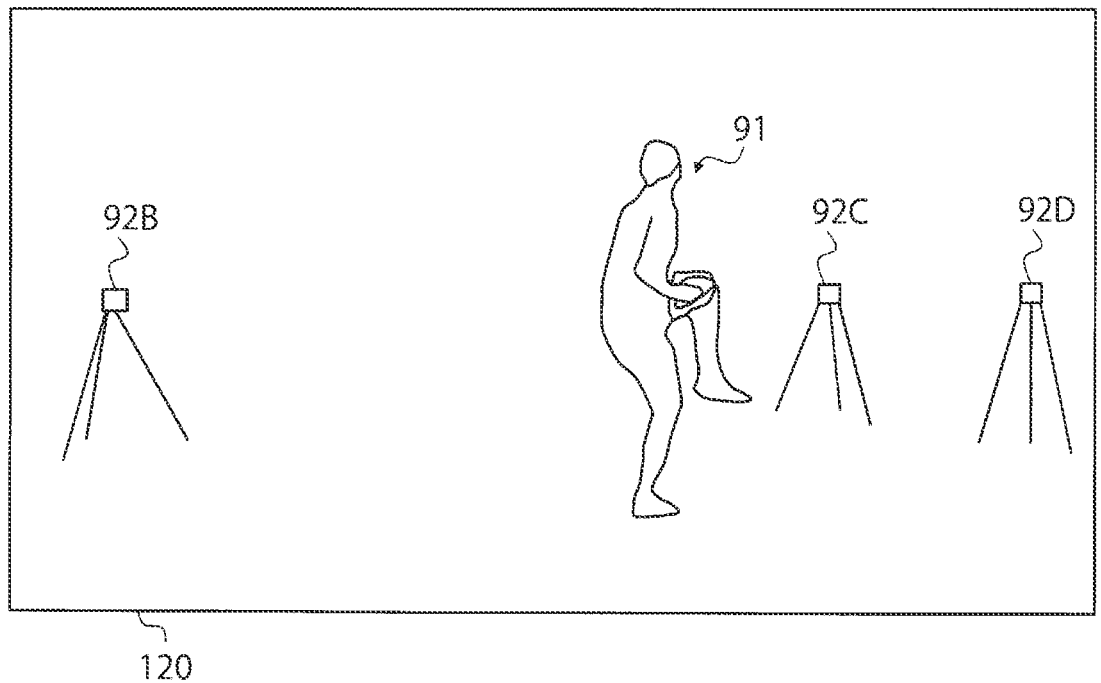
FIG. 4 is a view illustrating an example of a captured image on another viewpoint selected by the image selection unit.

FIGS. 3 and 4 illustrate examples of captured images 110 and 120 on two viewpoints selected by the image selection unit 60. The captured images 110 and 120 in FIGS. 3 and 4 include a baseball player 91, which is a subject. The captured images 110 and 120 include various objects or humans in an actual imaging environment. For example, the captured image 110 of FIG. 3 includes imaging cameras 92A, 92B, and 92C that are part of imaging cameras on the plurality of viewpoints surrounding the subject. The captured image 120 of FIG. 4 includes imaging cameras 92B, 92C, and 92D that are part of imaging cameras on the plurality of viewpoints surrounding the subject. The imaging cameras 92B and 92C are commonly included in the captured images 110 and 120 of FIGS. 3 and 4, but the imaging camera 92A is included only in the captured image 110 of FIG. 3, and the imaging camera 92D is included only in the captured image 120 of FIG. 4. Elements other than the imaging camera (for example, imaging staff, various types of equipment of imaging studio, and the like) may also be included in the captured images of FIGS. 3 and 4, but are not illustrated.

The image display control unit 22 displays the selected two captured images simultaneously or sequentially. As an example, the selected two captured images are reduced and arranged (synthesized) side by side in the three-dimensional image 71. The arrangement place of the reduced two captured images is, as an example, a place where the three-dimensional model 71 is not displayed. That is, the two captured images are arranged at positions where the three-dimensional model 71 is not hidden by the two captured images.

Figure 5:
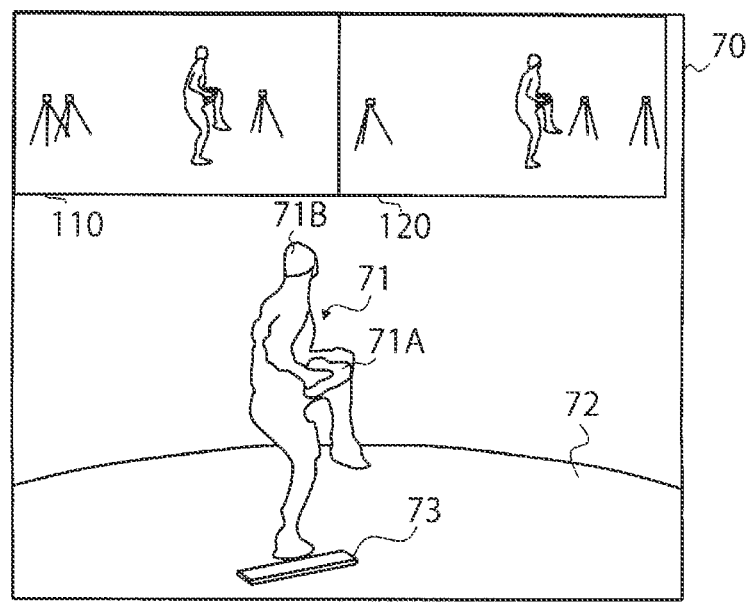
FIG. 5 is a view illustrating an example of reducing and synthesizing, with the three-dimensional image of FIG. 2, the captured images of FIGS. 3 and 4.

FIG. 5 illustrates an example of reducing and synthesizing, with the three-dimensional image 70 of FIG. 2, the captured images 110 and 120 of FIGS. 3 and 4. The captured images 110 and 120 are reduced and displayed in a region not including the subject on the upper side of the three-dimensional image 70.

In the example of FIG. 5, the selected two captured images are synthesized with the three-dimensional image 71, but these two captured images and the three-dimensional image 71 may be displayed in separate regions where a screen of the display unit 301 is divided into three. In this case, the three-dimensional image 71 is also reduced and displayed.

Furthermore, the selected two captured images may be displayed as a window different from that of the three-dimensional image 71.

Furthermore, not two captured images are simultaneously displayed, only one captured image may be displayed at first. After a feature point is selected with respect to the displayed captured image, the other captured image may be displayed. When the other captured image is displayed, display of the one captured image may be turned off. There are various variations in the display mode of the two captured images, and other modes are also possible.

Using the operation unit 201, the user selects, as feature points (first feature point and second feature point), positions corresponding to each other with respect to the captured images 110 and 120 on the two viewpoints. A specific example will be described below.

First, using the operation unit 201, the user inputs enlargement instruction information of the captured image 110. The operation instruction acquisition unit 31 of the interaction detection unit 30 acquires the enlargement instruction information of the captured image 110 and instructs the image display control unit 22 to enlarge and display the captured image 110. The image display control unit 22 enlarges and displays the captured image 110. At this time, the three-dimensional image 70 and the captured image 120 may be temporarily hidden by the captured image 110 displayed in an enlarged manner.

Using the operation unit 201, the user designates, as the first feature point, a desired position (first position) on the head of the subject in the enlarged captured image 110. The position acquisition unit 32 of the interaction detection unit 30 acquires the position information of the feature point from the operation unit 201, and stores the acquired position information into the position storage unit 40. Since the captured image 110 is a two-dimensional image, the first feature point has two-dimensional coordinates. In a case where the two-dimensional image is expressed in an uv coordinate system, the first feature point corresponds to the first uv coordinates. The image display control unit 22 displays the first feature point superimposed on the captured image 110. The first feature point is displayed by a mark having a predetermined shape, for example.

Figure 6:
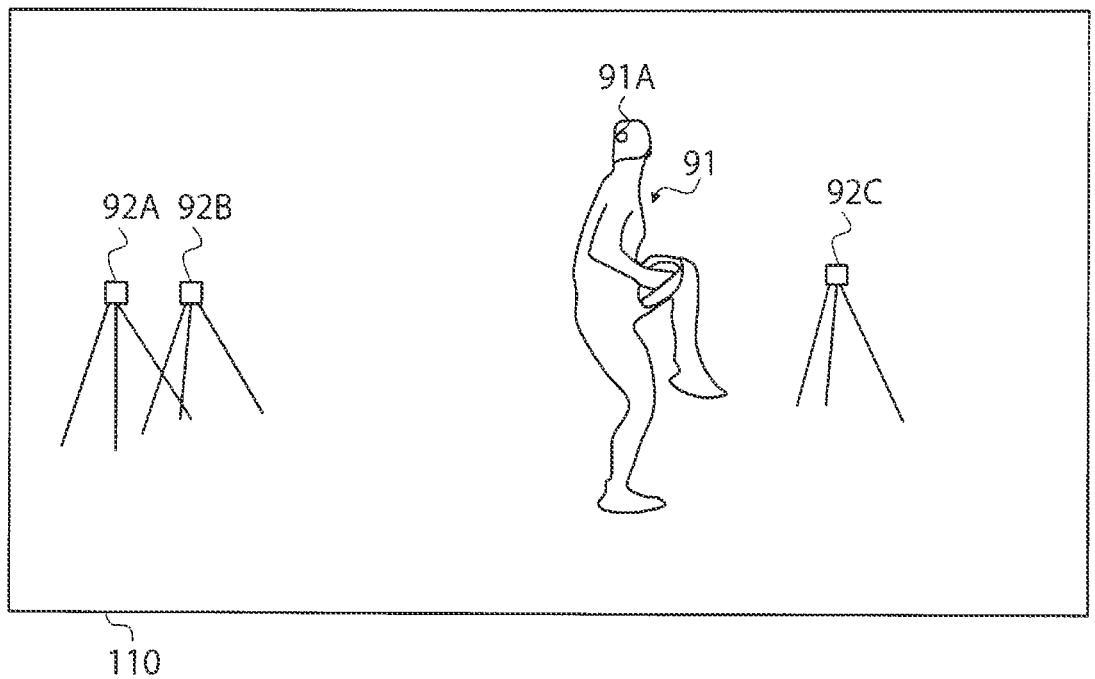
FIG. 6 is a view illustrating a state in which a user selects a first feature point in a captured image displayed in an enlarged manner.

FIG. 6 illustrates a state in which the user selects the first feature point in the captured image 110 displayed in an enlarged manner. A first feature point 91A is displayed being superimposed on a two-dimensional subject.

After selecting the first feature point, the user inputs reduction instruction information of the captured image 110. The operation instruction acquisition unit 31 of the interaction detection unit 30 acquires the reduction instruction information of the captured image 110 and instructs the image display control unit 22 to reduce and display the captured image 110. The image display control unit 22 reduces and displays the captured image 110. The captured image 110 returns to the original reduced size (see FIG. 5). The display of the first feature point 91A is included in the reduced captured image 110.

Next, using the operation unit 201, the user inputs enlargement instruction information of the captured image 120. The operation instruction acquisition unit 31 of the interaction detection unit 30 acquires the enlargement instruction information of the captured image 120 and instructs the image display control unit 22 to enlarge and display the captured image 120. The image display control unit 22 enlarges and displays the captured image 120. At this time, the three-dimensional image 70 and the captured image 110 may be temporarily hidden by the captured image 120 displayed in an enlarged manner.

Using operation unit 201, in the enlarged captured image 120, the user designates, as the second feature point, a position (second position) corresponding to the position designated in the captured image 110. That is, the user selects, as the first feature point and the second feature point, the same position in the subject in the captured images 110 and 120. If the positions clearly appear in the two captured images 110 and 120, the user can easily select the positions corresponding to each other in the two captured images 110 and 120. The position acquisition unit 32 of the interaction detection unit 30 acquires the position information of the second feature point from the operation unit 201, and stores the acquired position information into the position storage unit 40 as the second feature point. Since the captured image 120 is a two-dimensional image, the second feature point has two-dimensional coordinates. In a case where the two-dimensional image is expressed in an uv coordinate system, the second feature point corresponds to the second uv coordinates. The image display control unit 22 displays the second feature point (position information of the second position) superimposed on the captured image 120.

Figure 7:
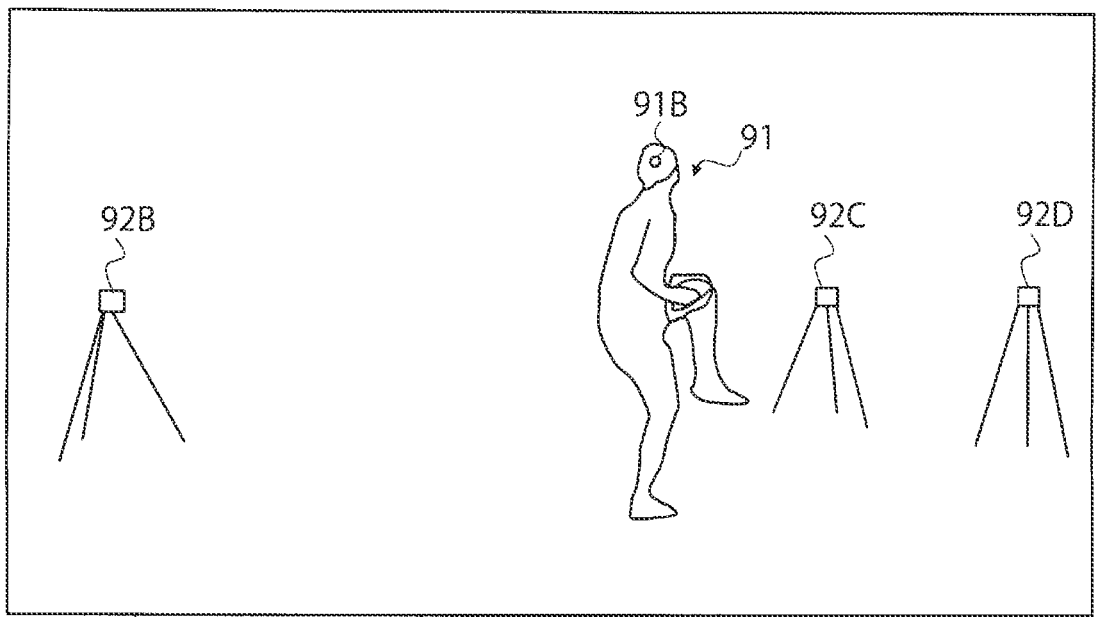
FIG. 7 is a view illustrating a state in which the user selects a second feature point in a captured image displayed in an enlarged manner.

FIG. 7 illustrates a state in which the user selects the second feature point in the captured image 120 displayed in an enlarged manner. The second feature point 91B is displayed being superimposed on the subject.

After selecting the second feature point, the user inputs reduction instruction information of the captured image 120. The operation instruction acquisition unit 31 of the interaction detection unit 30 acquires the reduction instruction information of the captured image 120 and instructs the image display control unit 22 to reduce and display the captured image 120. The image display control unit 22 reduces and displays the captured image 120. The captured image 120 returns to the original reduced size (see FIG. 5). The display of the second feature point 91B is included in the reduced captured image 120.

Figure 8:
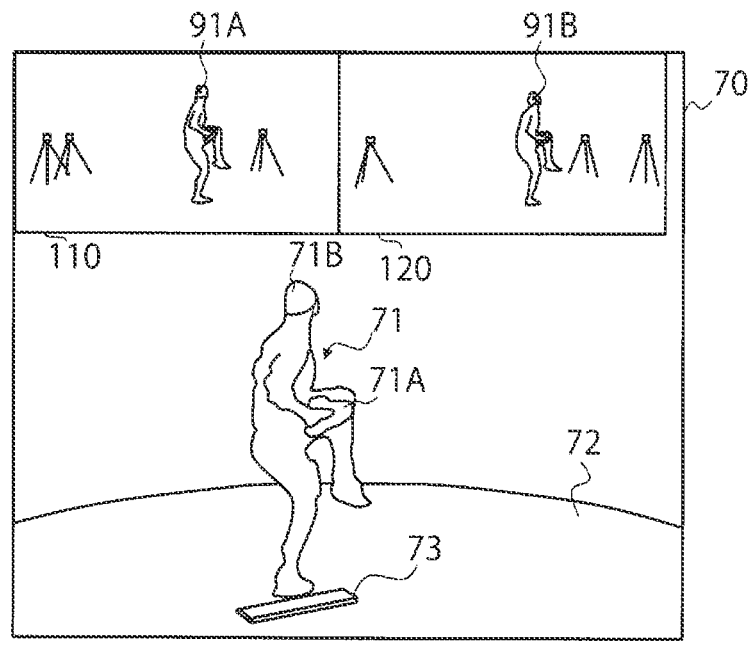
FIG. 8 is a view illustrating a display state after selection of the first feature point and the second feature point is completed.

FIG. 8 illustrates a display state after selection of the first feature point and the second feature point is completed in the state of FIG. 5. The first feature point 91A is displayed in the reduced captured image 110. The second feature point 91B is displayed in the reduced captured image 120.

When the position information of the first feature point and the position information of the second feature point are stored in the position storage unit 40, the target point calculation unit 50 calculates the position (third position) in the three-dimensional model by performing triangulation operation based on the first feature point and the second feature point on the basis of the information regarding the viewpoints of the selected two captured images (110 and 120). The position to be calculated is a three-dimensional coordinate and corresponds to the target point.

Figure 9:
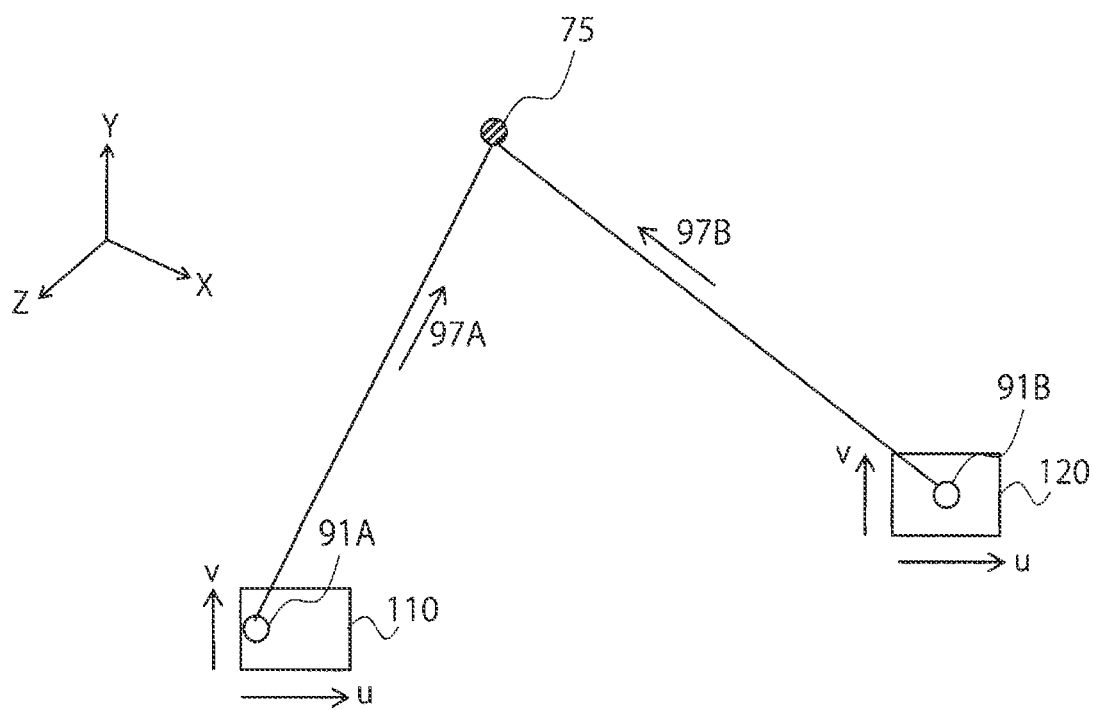
FIG. 9 is a view schematically illustrating an operation example of triangulation.

FIG. 9 schematically illustrates an operation example of triangulation. There is a coordinate system (XYZ coordinate system) representing a space in which the three-dimensional model exists. A point at which a straight line projected from the first feature point 91A in a line-of-sight direction 97A of the viewpoint of the one captured image 110 and a straight line projected from the second feature point 91B in a line-of-sight direction 97B of the viewpoint of the captured image 120 intersect is calculated by triangulation. The calculated point is defined as a target point 75. The target point 75 corresponds to a position in the three-dimensional model corresponding to the position selected by the user in the captured images 110 and 120. That is, if the feature points corresponding to each other in two captured images having different viewpoints are selected, one point on the three-dimensional model corresponding to these two feature points can be uniquely specified as a target point by the principle of triangulation.

The target point calculation unit 50 stores the position information on the target point calculated by triangulation into the position storage unit 40. When the position information on the target point is stored into the position storage unit 40, the target point display control unit 23 displays the target point superimposed on the three-dimensional image 70 according to the position information.

Figure 10:
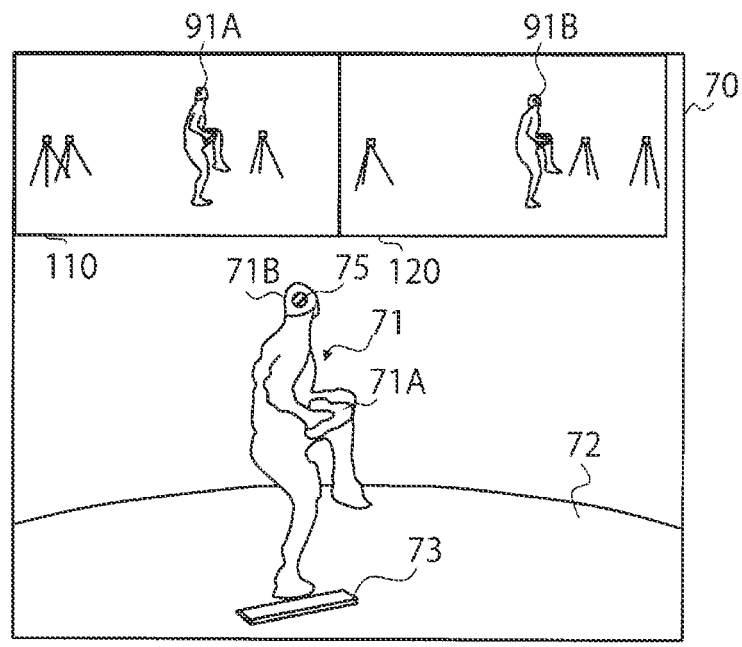
FIG. 10 is a view illustrating an example of displaying a target point in a three-dimensional image.

FIG. 10 illustrates an example in which the target point 75 is displayed in the three-dimensional image 70. The target point 75 is displayed at a three-dimensional position corresponding to the feature points 91A and 91B selected in the two captured images 110 and 120.

In a case of receiving an instruction to turn off display of the captured images 110 and 120 from the user in the display state of FIG. 10, the image display control unit 22 may turn off the display of the captured images 110 and 120.

Figure 11:
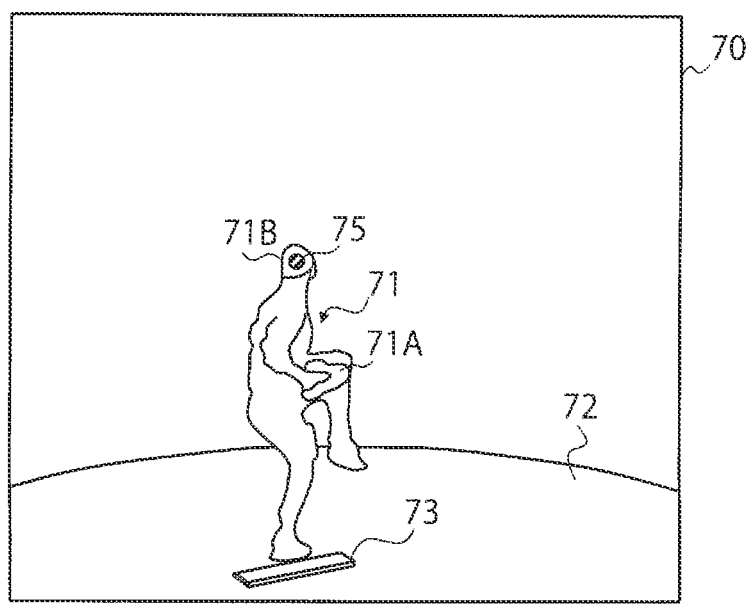
FIG. 11 is a view illustrating an example of turning off display of the captured image in the display state of FIG. 10.

FIG. 11 illustrates an example in which display of the captured images 110 and 120 is turned off in the display state of FIG. 10.

Figure 12:
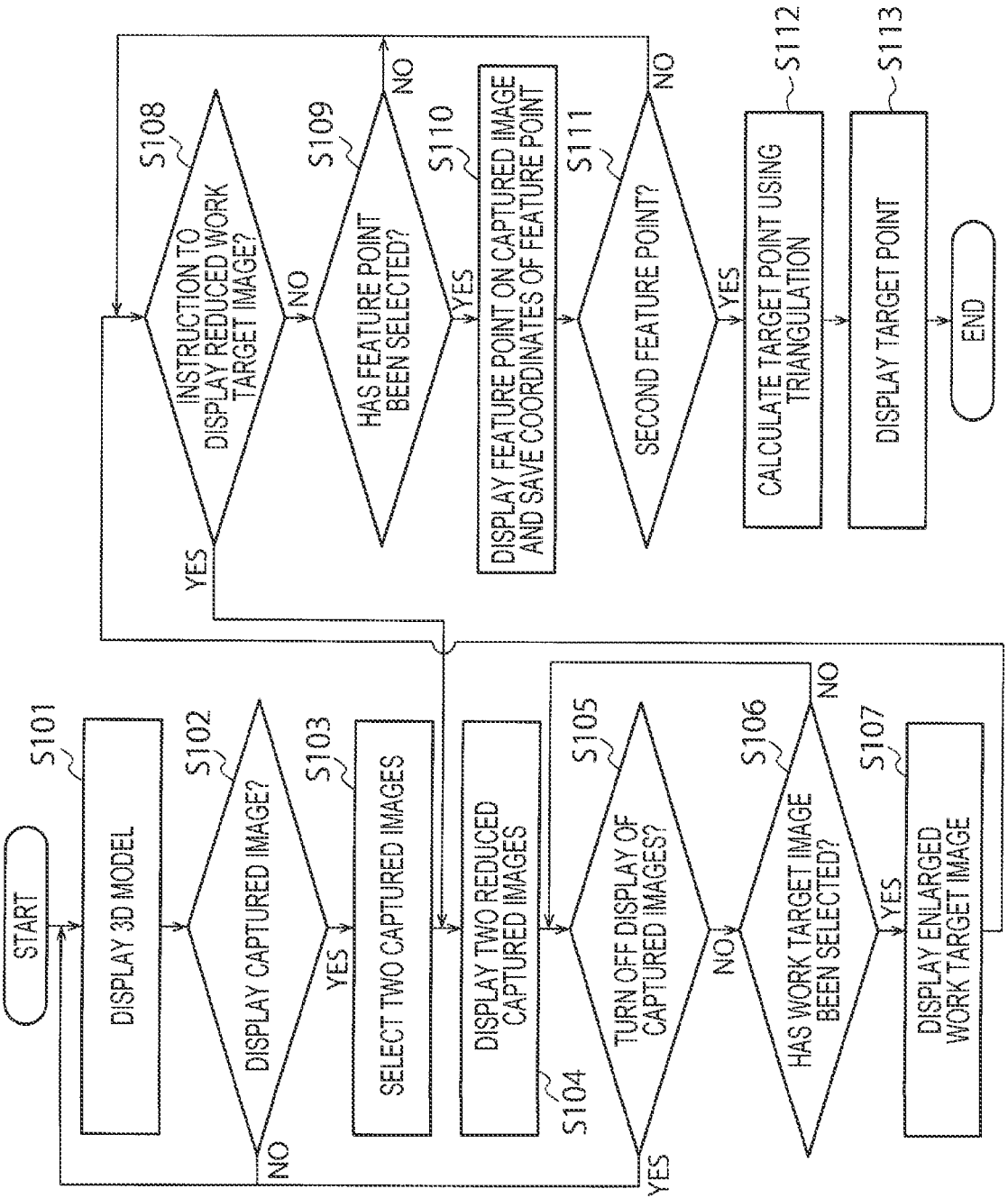
FIG. 12 is a flowchart of an example of an operation of the information processing device according to the first embodiment.

FIG. 12 is a flowchart of an example of the operation of the information processing device 101 according to the first embodiment. The model display control unit 21 reads the three-dimensional model information from the information storage unit 10 and displays the three-dimensional model (S101). The viewpoint for viewing the three-dimensional model may be changed on the basis of operation information from the user. The operation instruction acquisition unit 31 determines whether instruction information for displaying the captured image has been received from the user (S102). In a case where the instruction information has not been received, the process returns to step S101. In a case where the instruction information has been received, the image selection unit 60 selects the captured image corresponding to the displayed three-dimensional model from the information storage unit 10 (S103). The image display control unit 22 reduces and displays, on the display unit 301, the selected two captured images (S104). As an example, the image selection unit 60 selects captured images on two viewpoints closest to the viewpoints of the displayed three-dimensional model. The user may instruct to change one or both of the two captured images displayed on the display unit 301 to another captured image. In this case, the image selection unit 60 selects the another captured image according to the instruction information of the user. Alternatively, all or a certain number of captured images corresponding to the displayed three-dimensional model may be displayed, and the user may select two captured images to use from these captured images. As an example, the user selects a captured image in which a desired position clearly appears.

The operation instruction acquisition unit 31 determines whether instruction information for turning off the display of the captured image has been received from the user (S105). In a case where the instruction information for turning off has been received, the image display control unit 22 is caused to turn off the display of the two captured images, and the process returns to step S101. When the instruction information for turning off has not been received, the process proceeds to step S106.

The operation instruction acquisition unit 31 determines whether instruction information for selecting or enlarging one (work target image) of the displayed two captured images has been received from the user (S106). In a case where the instruction information for selecting the work target image has not been received, the process returns to step S105. In a case where the instruction information has been received, the image display control unit 22 is caused to enlarge and displays the captured image designated by the instruction information (S107).

The operation instruction acquisition unit 31 determines whether reduction instruction information of the captured image displayed in an enlarged manner has been received from the user (S108). In a case where the reduction instruction information has been received, the process returns to step S104, and the image display control unit 22 is caused to reduce the captured image displayed in an enlarged manner to the original state. In a case where the reduction instruction information has not been received, the position acquisition unit 32 determines whether the information for selecting the feature point (first position) has been input by the user (S109). The user selects the feature point, for example, by moving a cursor to a desired position in the captured image displayed in an enlarged manner and clicking or tapping the cursor. In a case where the information for selecting the feature point has not been input, the process returns to step S108. In a case where the information for selecting the feature point has been input, the position acquisition unit 32 stores the position information (coordinates) of the selected feature point into the position storage unit 40 (S110). The image display control unit 22 reads the position information of the feature point from the position storage unit 40, and displays the feature point on the captured image according to the position information. The feature point is displayed as a mark in a discretionary shape, a discretionary color, or a discretionary pattern, as an example.

Whether the feature point stored in step S110 is the first feature point or the second feature point is determined (S111). In the case of the first feature point, that is, in the case where the second feature point has not yet been selected, the process returns to step S108. In the case of the second feature point, the target point calculation unit 50 calculates the target point (third position) by performing triangulation operation on the basis of the selected two feature points and information (position, orientation, and the like) regarding the viewpoint corresponding to the two captured images in which the two feature points are selected (S112). The target point calculation unit 50 stores the position information on the target point into the position storage unit 40. The target point display control unit 23 reads the position information on the target point from the position storage unit 40, and displays the target point superimposed on the three-dimensional model according to the position information (S113). The target point is displayed as a mark in a discretionary shape, a discretionary color, or a discretionary pattern, as an example.

Through the above processing, a position obtained by triangulation operation from the two feature points selected by the user is acquired as a target point. Then, the acquired target point is displayed being superimposed on the three-dimensional model. Therefore, the user can easily designate a discretionary position (target point) in the three-dimensional model by selecting feature points corresponding to each other in the subject included in the two captured images.

As described above, according to the first embodiment, if the feature points corresponding to each other in two captured images having different viewpoints are selected, a point (position) on the three-dimensional model corresponding to these feature points can be uniquely specified by the principle of triangulation. Therefore, the user can easily designate a discretionary position (target point) in the three-dimensional model by selecting feature points corresponding to each other in the subject included in the two captured images. In particular, even if a part of the three-dimensional model is missing or hidden, it is possible to accurately designate the position in the part. A specific example will be described below.

Figure 13:
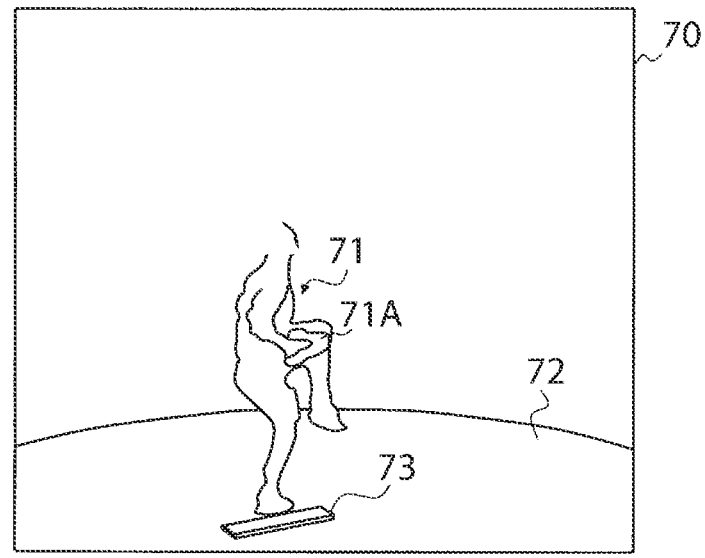
FIG. 13 is a view illustrating an example in which a part (head) of a three-dimensional model is missing.

FIG. 13 illustrates an example in which a part (head) of a three-dimensional model is missing. As described above, even if a part of the three-dimensional model is missing, if two captured images in which the head clearly appears are selected and the corresponding feature points are selected in each, the target point included in the missing part can be accurately specified.

Figure 14:
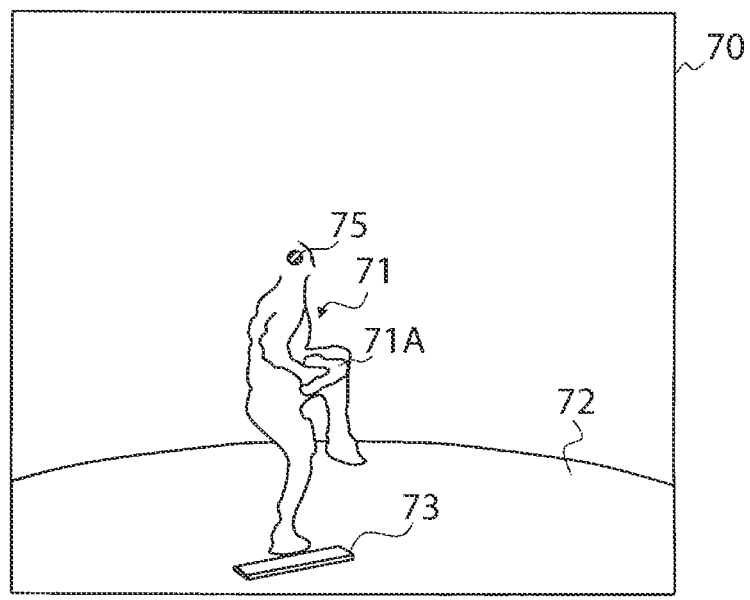
FIG. 14 is a view illustrating an example of specifying a target point in a missing part of the three-dimensional model.

FIG. 14 illustrates an example of specifying a target point in a missing part of the three-dimensional model.

As described above, according to the first embodiment, it becomes possible to highly accurately designate a discretionary position included in the three-dimensional model.

First Modification Example

Although one target point is calculated in the present embodiment, two or more target points may be calculated in the same three-dimensional model, and these target points may be displayed being superimposed on the three-dimensional model. In this case, the operation of the flowchart of FIG. 11 is only required to be repeatedly executed by the number of target points to be calculated.

Figure 15:
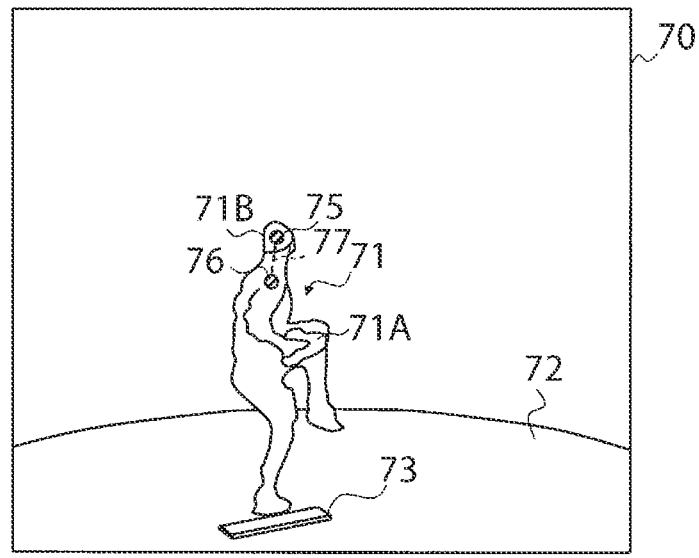
FIG. 15 is a view illustrating an example of calculating and displaying two target points superimposed on a three-dimensional model.

FIG. 15 illustrates an example of calculating two target points and displaying the calculated target points superimposed on the three-dimensional model. In addition to the target point 75 on the head of the subject, a target point 76 is displayed on the shoulder of the subject. A line segment 77 connecting the target point 75 and the target point 76 is drawn by the model display control unit 21 or the target point display control unit 23. The line segment 77 may be drawn on the basis of operation information of the user using the operation unit 201. The user can evaluate the pitching form by analyzing the angle, distance, or the like of the line segment 77, for example. The evaluation of pitching may be performed by the user, or may be performed by execution of an application for evaluating pitching. In this case, the application may perform the evaluation on the basis of a neural network that outputs the pitching evaluation value using the angle, distance, or the like of the line segment as an input.

Second Modification Example

In the first modification example, the two target points are calculated with respect to the three-dimensional image of the same frame, but the two target points may be calculated with respect to the three-dimensional images of different frames. For example, the target point may be calculated with respect to the same position of the subject in the three-dimensional image of each frame, and the locus of movement of the target point may be analyzed between frames. Hereinafter, a specific example will be described with reference to FIGS. 16 and 17.

Figure 16:
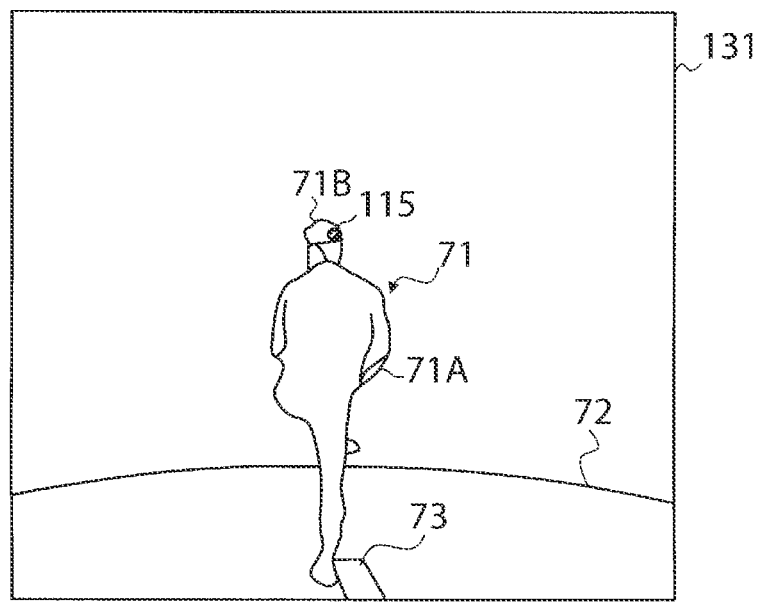
FIG. 16 is a view illustrating an example of displaying a three-dimensional image corresponding to a certain frame.

FIG. 16 illustrates an example in which a three-dimensional image 131 corresponding to a certain frame is displayed from a certain user viewpoint. In FIG. 16, the three-dimensional model 71 is viewed from a different viewpoint from the example of the present embodiment described above (see FIG. 2 and the like). A target point 115 is calculated by the processing of the present embodiment described above, and the target point 115 (position information of the third position) is displayed being superimposed on the three-dimensional model 71.

Figure 17:
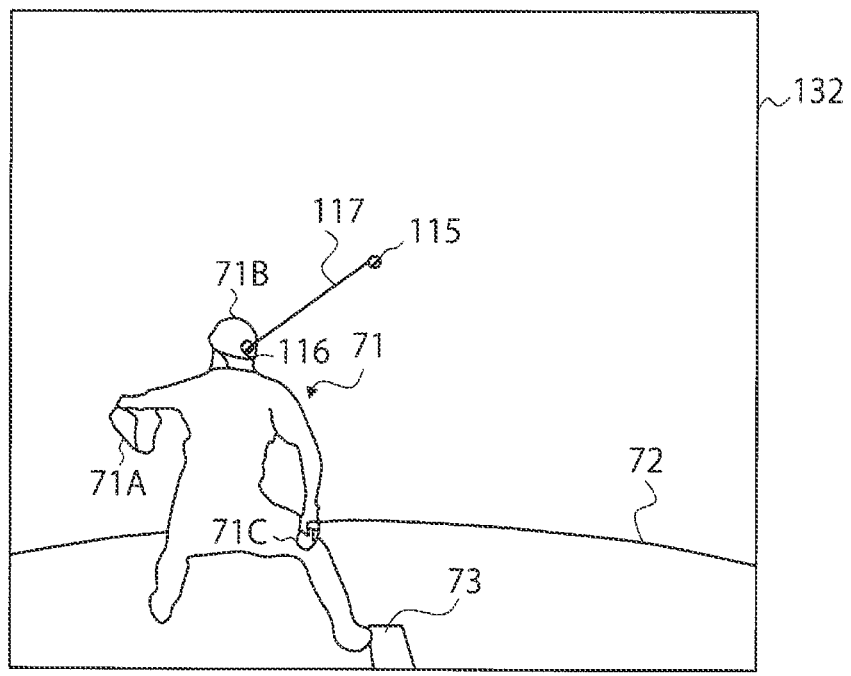
FIG. 17 is a view illustrating a display example of a three-dimensional image a plurality of frames after the display state of FIG. 16.

FIG. 17 illustrates a display example of a three-dimensional image 132 including a three-dimensional model a plurality of frames after the display state of FIG. 16. Note that the user's viewpoint has been slightly moved by the user's operation with respect to FIG. 16. A target point 116 is calculated and displayed at the same position corresponding to the target point 115 of the subject in FIG. 16. Furthermore, the target point 115 calculated at first is also displayed. That is, the target point display control unit 23 displays the secondly calculated target point while fixing the display of the firstly calculated target point. Furthermore, a line segment 117 connecting the target point 115 and the target point 116 is drawn by the model display control unit 21 or the target point display control unit 23. The line segment 117 represents a movement locus of a specific position on the head of the subject at the time of pitching. The line segment 117 may be drawn by operation information of the user using the operation unit 201. The pitching form of the subject can be evaluated by analyzing the angle, distance, or the like of the line segment 117. The evaluation of pitching may be performed by the user, or may be performed by execution of an application for evaluating pitching. In this case, the application may perform the evaluation on the basis of a neural network that outputs the pitching evaluation value using the angle, distance, or the like of the line segment as an input.

Second Embodiment

In the first embodiment, when the user selects the feature point in the two captured images, the user selects the feature point intuitively or by eye, and therefore, there is a possibility that the feature point to be selected secondly does not correctly correspond to the feature point selected firstly. That is, there is a possibility that the feature points selected firstly and secondly do not point to the same place in the subject (possibility that the positions of the feature points are slightly shifted from each other). In the present embodiment, when the feature point is selected for a captured image corresponding to one viewpoint, an epipolar line of the imaging camera corresponding to the other viewpoint is calculated. The calculated epipolar line is displayed on the captured image corresponding to the other viewpoint as guide information for selecting the other feature point. The user selects a feature point from the epipolar line. Therefore, the position corresponding to the feature point selected first can be easily selected.

Figure 18:
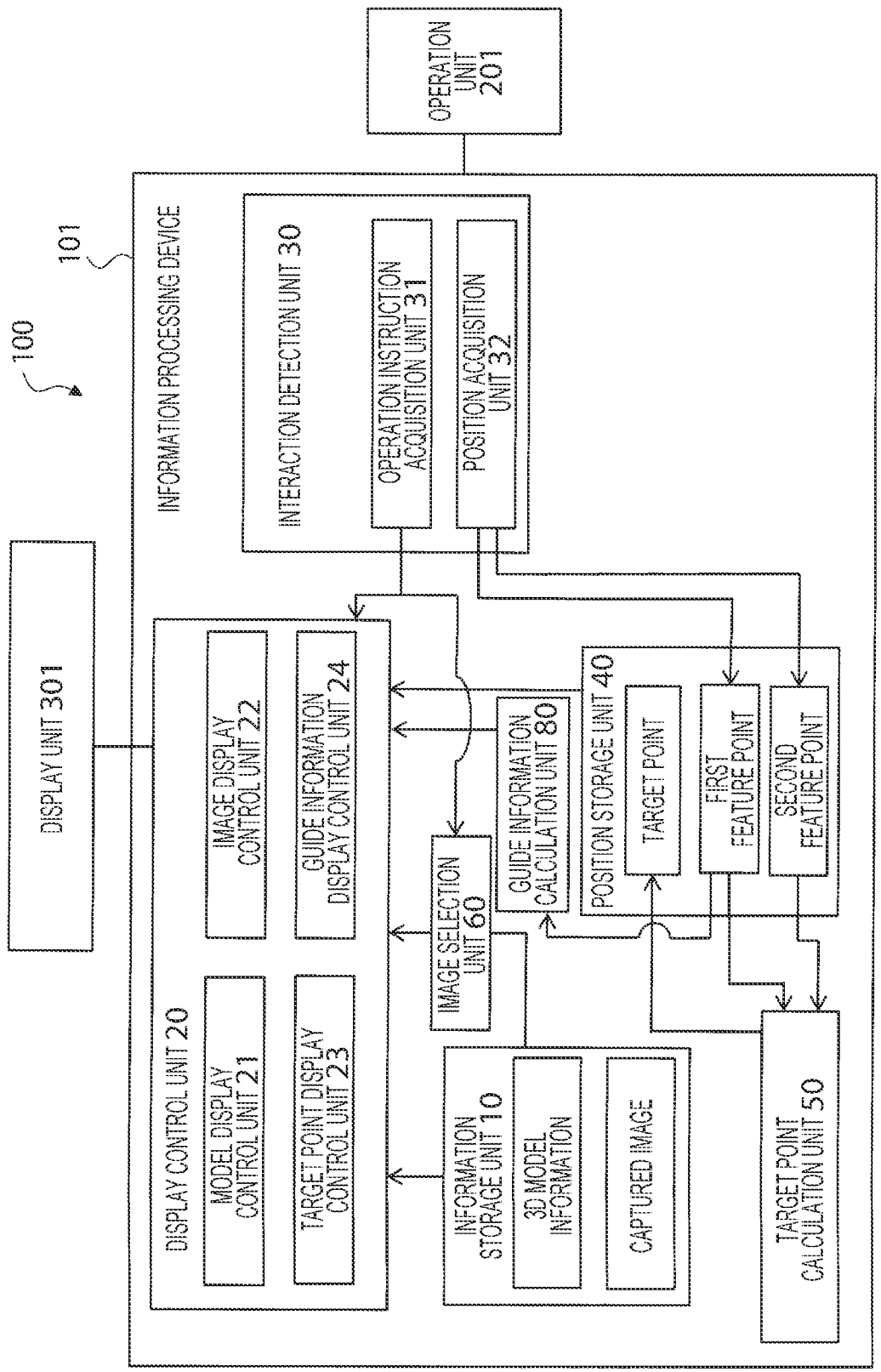
FIG. 18 is a block diagram of an information processing system including an information processing device according to a second embodiment.

FIG. 18 is a block diagram of an information processing system 100 including an information processing device 101 according to the second embodiment. Elements having the same names as those of the information processing system 100 of FIG. 1 are given the same reference signs, and description will be omitted except for extended or changed processing. In the information processing device 101 of FIG. 18, a guide information calculation unit 80 and a guide information display control unit 24 are added.

When the first feature point is selected by the user, the guide information calculation unit 80 reads the position information of the first feature point from the position storage unit 40. The guide information calculation unit 80 calculates the epipolar line of the imaging camera corresponding to the other viewpoint on the basis of the camera parameters (for example, the positions and orientations of the two viewpoints) and the first feature point. The guide information display control unit 24 displays the calculated epipolar line superimposed on the captured image for selecting the second feature point. The epipolar line becomes a guide for the user to select the second feature point.

Figure 19:
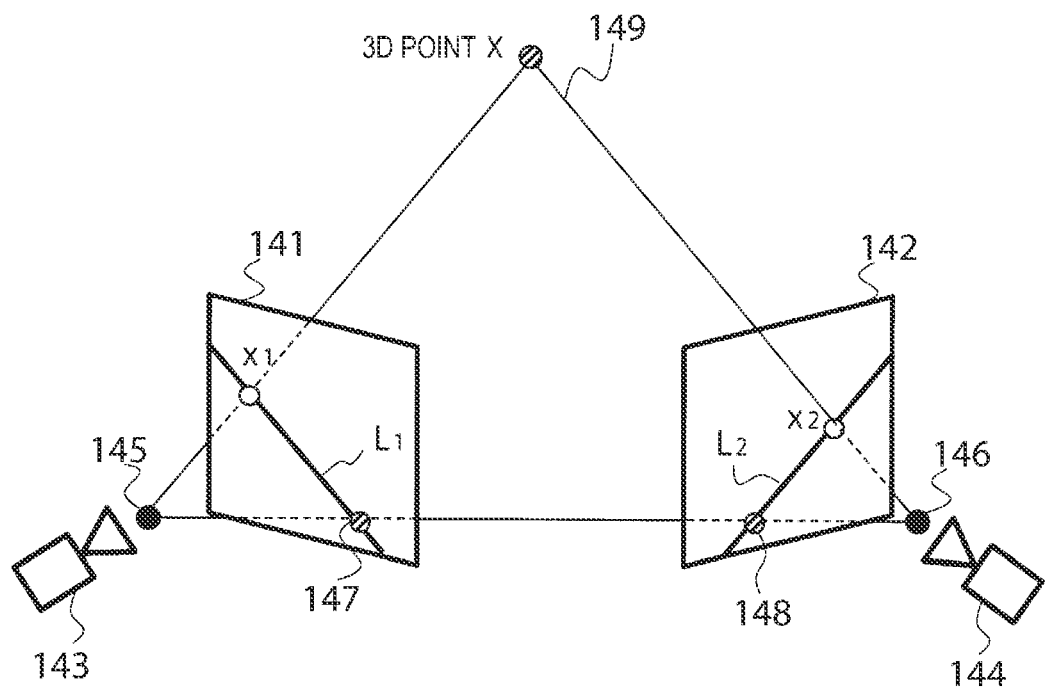
FIG. 19 is an explanatory view of an epipolar line.

FIG. 19 is an explanatory view of the epipolar line. Two viewpoints (imaging cameras) 143 and 144 are illustrated. Intersections between line segments connecting the positions (light source positions) 145 and 146 of the imaging cameras 143 and 144 and image planes 141 and 142 of the imaging cameras 143 and 144 correspond to epipoles 147 and 148. The epipole can be said to be an image in which the viewpoint of one imaging camera is projected onto the viewpoint of the other imaging camera. A discretionary point in a three-dimensional space is defined as a point X, and projection points when the point X is projected onto the image planes 141 and 142 of the imaging cameras 143 and 144 are defined as x1 and x2. The plane containing the three-dimensional point X and the positions 145 and 146 is called an epipolar plane 149. An intersection line between the epipolar plane 149 and the image plane 141 is an epipolar line L1 of the imaging camera 143. An intersection line between the epipolar plane and the image plane 142 is an epipolar line L2 of the imaging camera 144.

When the discretionary point x1 on the image plane 141 is given, the epipolar line L2 on the image plane 142 is determined according to the line-of-sight direction of the imaging camera 143. Then, according to the position of the point X, a point corresponding to the point x1 is determined at any position on the epipolar line L2. This rule is called epipolar constraint. This constraint is expressed by the following equation.

$$m'^T F m = 0 \qquad \text{[Equation 1]}$$

m is what the point x1 is converted from a normalized image coordinates to an image coordinate system, and m=Ax1. A is an internal parameter matrix of the imaging camera 143. m' is what the point x2 is converted from the normalized image coordinates to the image coordinate system, and m'=A'x2. A' is an internal parameter matrix of the imaging camera 144. F is called a basic matrix. F can be calculated from the camera parameters using a technique such as an eight-point algorithm. Therefore, when the point m on the image of the imaging camera 143 is determined, the corresponding point is determined to be any one on the epipolar line of the imaging camera 144.

In the present embodiment, on the basis of the epipolar constraint, when a feature point is selected for one of the selected two captured images, the epipolar line is calculated for the imaging camera of the other captured image. The calculated epipolar line is displayed being superimposed on the other captured image. Since the point corresponding to the first feature point exists on the epipolar line, the user can easily select the feature point corresponding to one feature point by selecting the second feature point from the epipolar line. Only a straight line of a part of the epipolar line, for example, a part overlapping the three-dimensional model, may be displayed.

Hereinafter, a specific example of the second embodiment will be described. It is assumed that the user selects the feature point 91A at the position illustrated in FIG. 6 described above with respect to the first captured image of the two captured images. The guide information calculation unit 80 calculates an epipolar line for the second captured image on the basis of the position of the feature point 91A and the camera parameters of the imaging camera that has captured the selected two captured images. The calculated epipolar line is displayed being superimposed on the second captured image.

Figure 20:
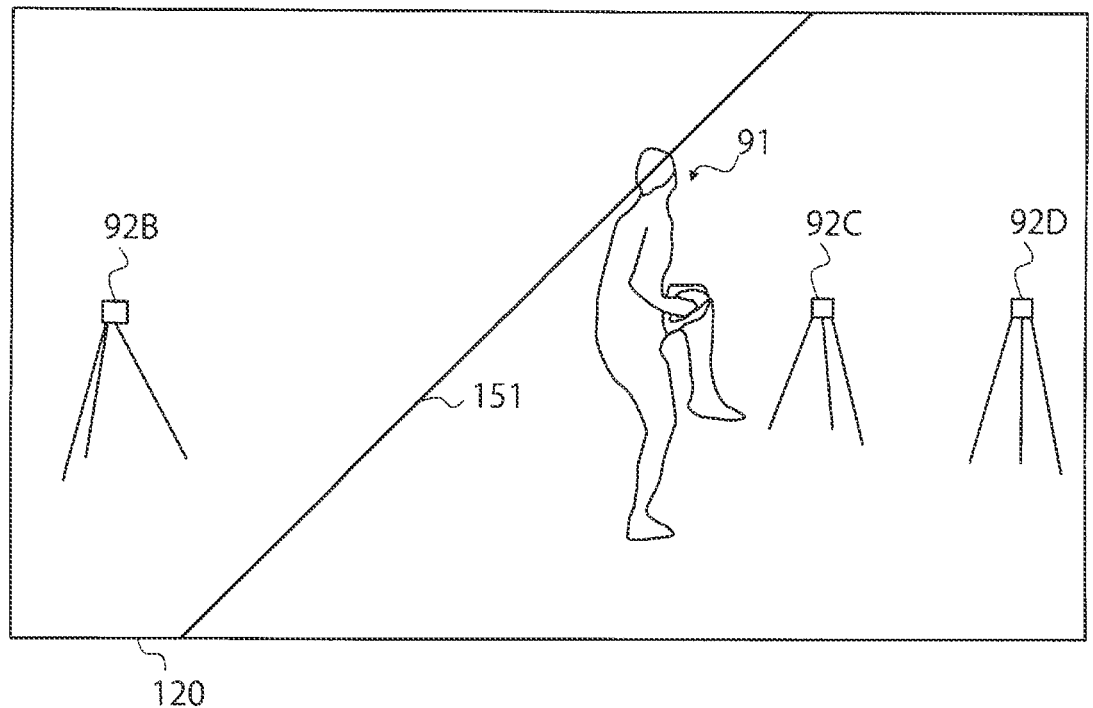
FIG. 20 is a view illustrating an example of displaying an epipolar line superimposed on a captured image.

FIG. 20 illustrates an example in which an epipolar line 151 is displayed being superimposed on the second captured image. The user is only required to select, as the second feature point, a point corresponding to the first feature point from the epipolar line 151. Therefore, the user can highly accurately select the second feature point.

Figure 21:
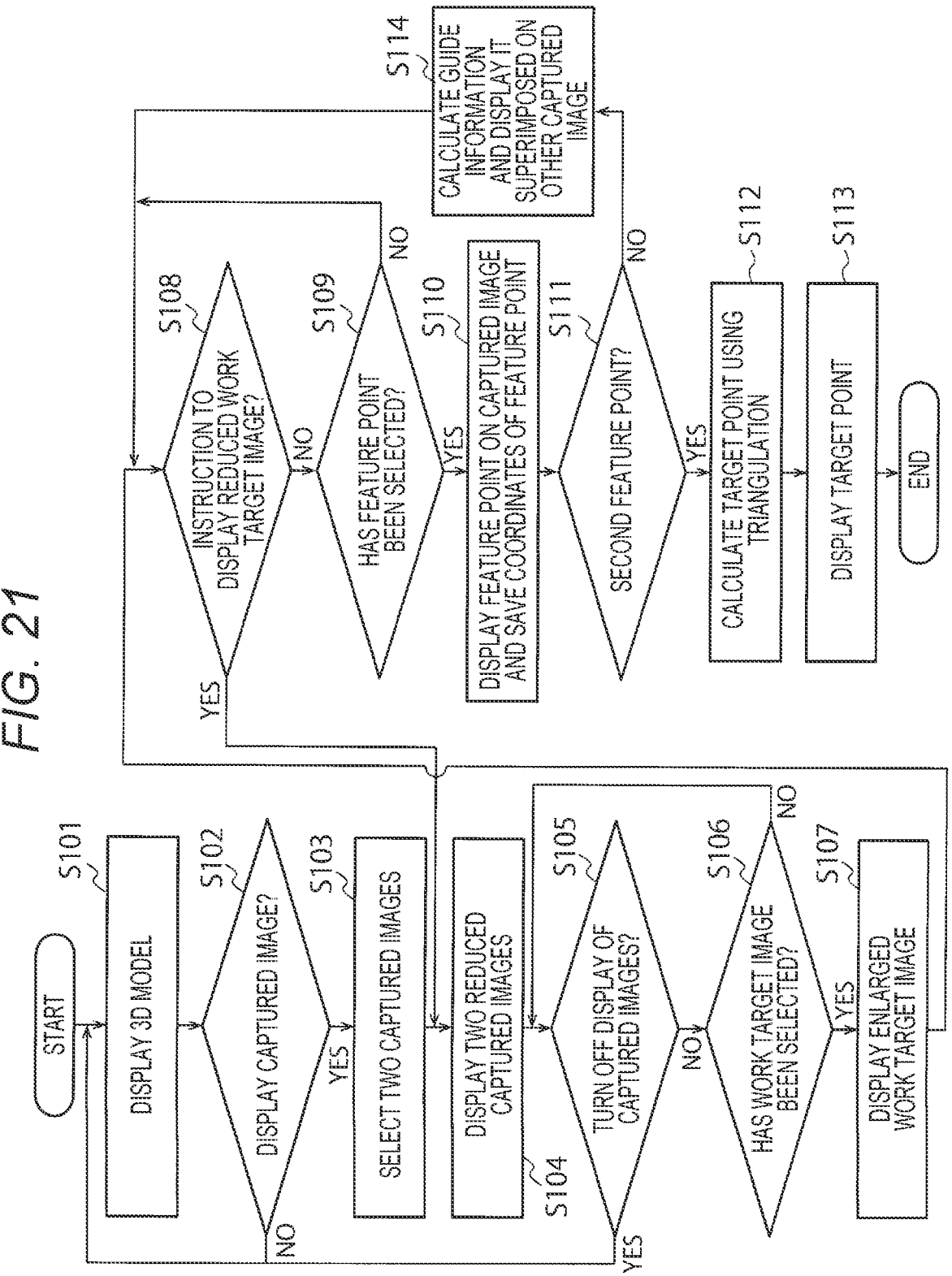
FIG. 21 is a flowchart of an example of an operation of the information processing device according to the second embodiment.

FIG. 21 is a flowchart of an example of the operation of the information processing device 101 according to the second embodiment. A difference from the flowchart of FIG. 12 of the first embodiment will be mainly described, the same steps as those in the flowchart of FIG. 12 are given the same reference signs, and the description will be appropriately omitted.

In a case where it is determined in step S111 that the first feature point has been saved, the process proceeds to step S114. In step S114, the guide information calculation unit 80 calculates the epipolar line as the guide information for selecting the second feature point on the basis of the position information of the first feature point and the camera parameters of the viewpoints (imaging cameras) of the selected two captured images. The guide information display control unit 24 displays the calculated epipolar line superimposed on the second captured image (reduced and displayed) different from the captured image in which the first feature point is selected. Thereafter, the process returns to step S108. By instructing reduced display of the first captured image (YES in S108) and instructing enlarged display of the second captured image (S107 after NO in S105 and YES in S106), the user can select the second feature point in a state where the epipolar line is displayed on the enlarged captured image.

According to the second embodiment, an epipolar line with respect to a captured image for selecting the second feature point is calculated on the basis of the first feature point and the camera parameters, and the epipolar line is superimposed on the captured image as the guide information. Since the user is only required to select the second feature point from the epipolar line, it is possible to easily and accurately select the feature point corresponding to the first feature point.

Modification Example

The target point display control unit 23 may move the target point superimposed on the three-dimensional model on the basis of the instruction information of the user. For example, in a case where the calculated target point deviates from the position desired by the user and the user wants to finely adjust the position of the target point, it is conceivable to move the target point in this manner.

In a case where the user desires to move the target point, the user selects, with a cursor, touch, or the like, the target point displayed on the screen, and inputs, from the operation unit 201, instruction information for moving the target point. In accordance with the input instruction information, the target point display control unit 23 moves the target point displayed on the screen.

At this time, the two feature points (first feature point and second feature point) from which the target point is calculated are also moved in accordance with the movement of the target point. Specifically, the target point calculation unit 50 calculates two feature points satisfying the epipolar constraint with respect to the moved target point, and moves the original feature point to the position of the calculated feature point. Therefore, the user can learn which position should have been selected as the feature point.

Figure 22:
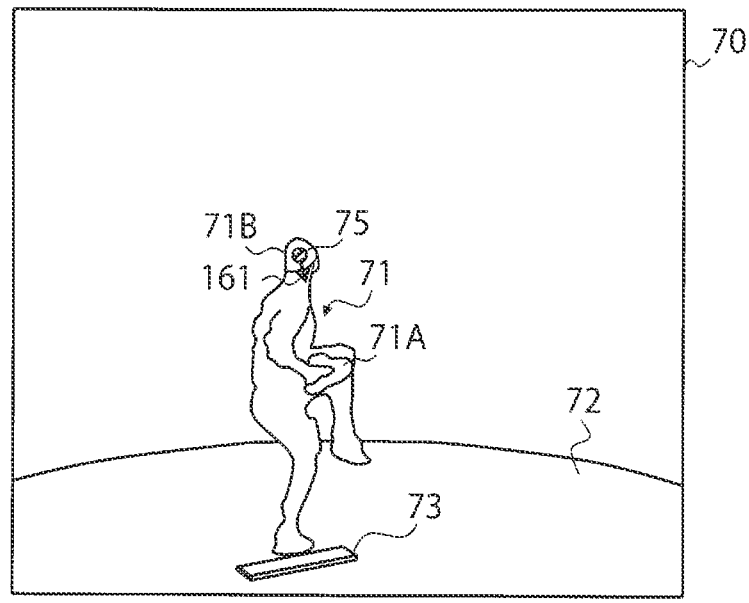
FIG. 22 is a view explaining a modification example of the second embodiment.
Figure 23:
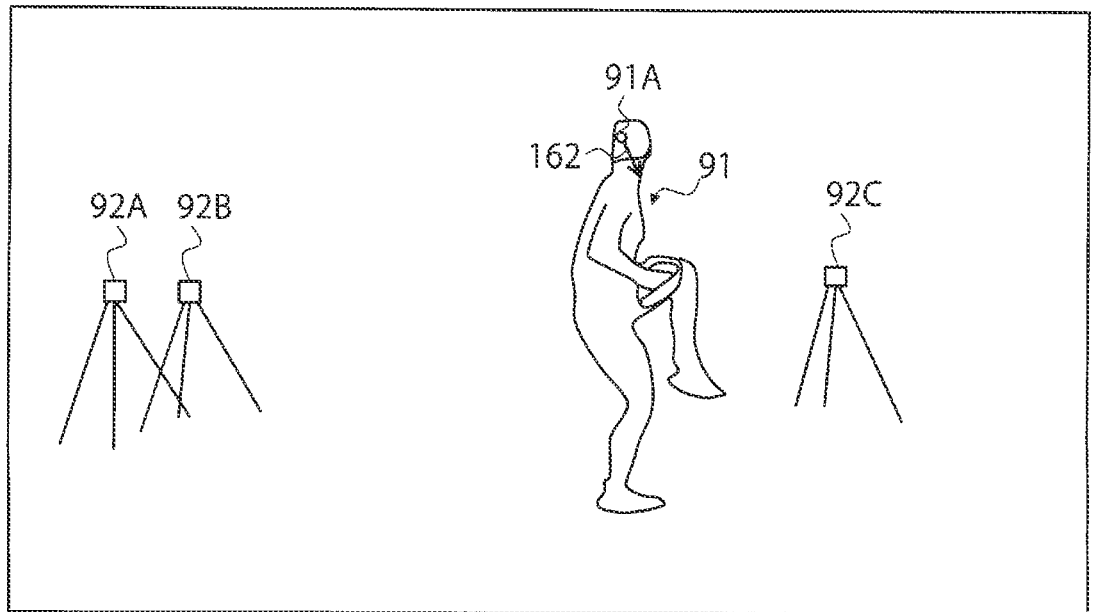
FIG. 23 is a view explaining a modification example of the second embodiment.
Figure 24:
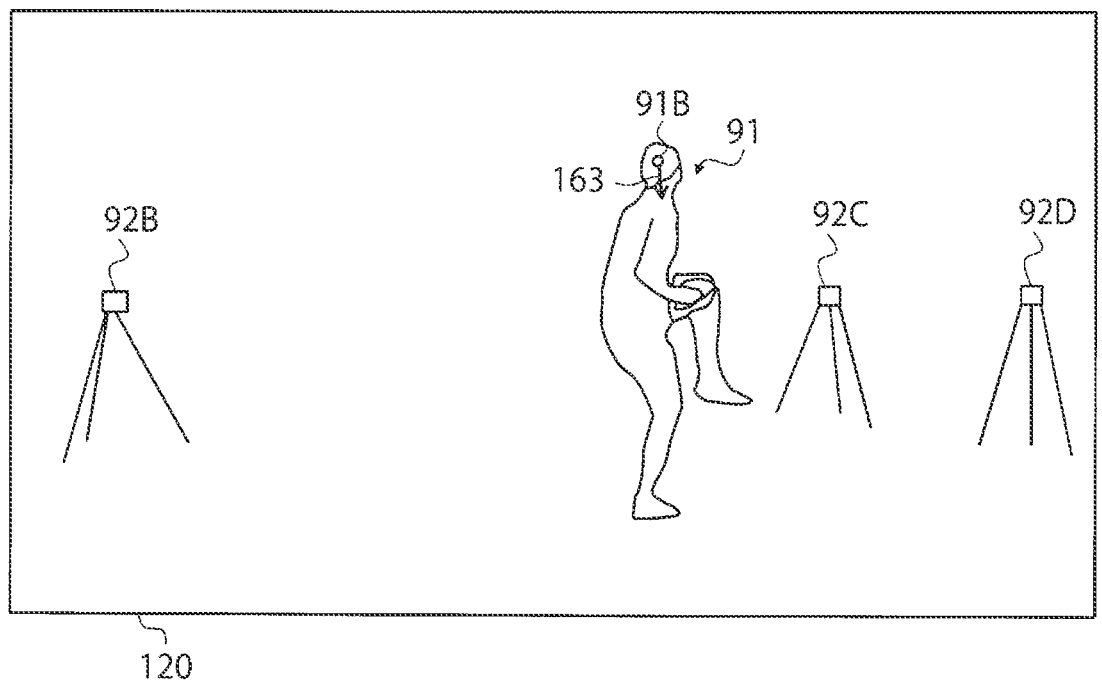
FIG. 24 is a view explaining a modification example of the second embodiment.

FIGS. 22 to 24 illustrate specific examples of the present modification example. FIG. 22 illustrates a scene in which the target point 75 is moved from the state of FIG. 11 in a direction 161 in accordance with the instruction information of the user. FIG. 23 illustrates a scene in which the feature point 91A selected in FIG. 6 is moved in a direction 162 in accordance with the movement of the target point 75. FIG. 24 illustrates a scene in which the feature point 91B selected in FIG. 7 is moved in a direction 163 in accordance with the movement of the target point 75. The target point 75 after the movement and the feature points 91A and 91B after the movement satisfy the epipolar constraint.

(Hardware Configuration)

Figure 25:
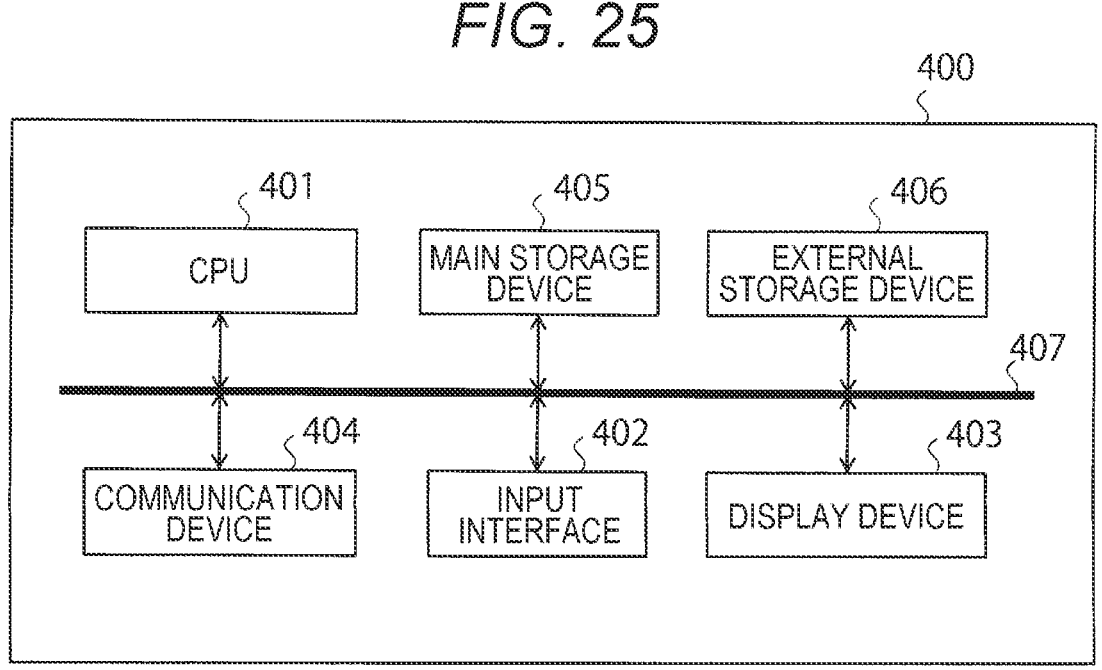
FIG. 25 is a view illustrating an example of a hardware configuration of an information processing device.

FIG. 25 illustrates an example of the hardware configuration of the information processing device 101 in FIG. 1 or 18. The information processing device 101 in FIG. 1 or 18 is configured with a computer device 400. The computer device 400 includes a CPU 401, an input interface 402, a display device 403, a communication device 404, a main storage device 405, and an external storage device 406, which are connected to one another via a bus 407. As an example, the computer device 400 is configured as a smartphone, a tablet, a desktop personal computer (PC), or a laptop PC.

The central processing unit (CPU) 401 executes an information processing program, which is a computer program, on the main storage device 405. The information processing program is a program that implements each of the above-described functional configurations of the information processing device 101. The information processing program may be implemented not by one program but by a combination of a plurality of programs and scripts. When the CPU 401 executes the information processing program, each functional configuration is implemented.

The input interface 402 is a circuit for inputting operation signals from input devices such as a keyboard, a mouse, and a touchscreen to the information processing device 101. The input interface 402 may include an imaging device such as a camera and sensors such as a time of flight (TOF) sensor and light detection and ranging (LiDAR).

The display device 403 displays data output from the information processing device 101. The display device 403 is, for example, a liquid crystal display (LCD), an organic electroluminescence display, a cathode ray tube (CRT), or a plasma display (PDP), but is not limited to this. Data output from the computer device 400 can be displayed on this display device 403.

The communication device 404 is a circuit for the information processing device 101 to communicate with an external device in a wireless or wired manner. The data can be input from an external device via the communication device 404. The data input from the external device can be stored in the main storage device 405 or the external storage device 406.

The main storage device 405 stores the information processing program, data necessary for execution of the information processing program, data generated by execution of the information processing program, and the like. The information processing program is developed on the main storage device 405 and executed. The main storage device 405 is, for example, a RAM, a DRAM, or an SRAM, but is not limited to this. The information storage unit 10 or the position storage unit 40 may be constructed on the main storage device 405.

The external storage device 406 stores the information processing program, data necessary for execution of the information processing program, data generated by execution of the information processing program, and the like. These information processing program and the data are read out to the main storage device 405 when the information processing program is executed. The external storage device 406 is, for example, a hard disk, an optical disk, a flash memory, or a magnetic tape, but the information storage unit 10 or the position storage unit 40 is not limited to this may be constructed on the external storage device 406.

Note that the information processing program may be installed in the computer device 400 in advance or may be stored in a storage medium such as a CD-ROM. Furthermore, the information processing program may be uploaded on the Internet.

Furthermore, the information processing device 101 may be configured with the single computer device 400, or may be configured as a system including a plurality of the computer devices 400 connected to one another.

Third Embodiment

Figure 26:
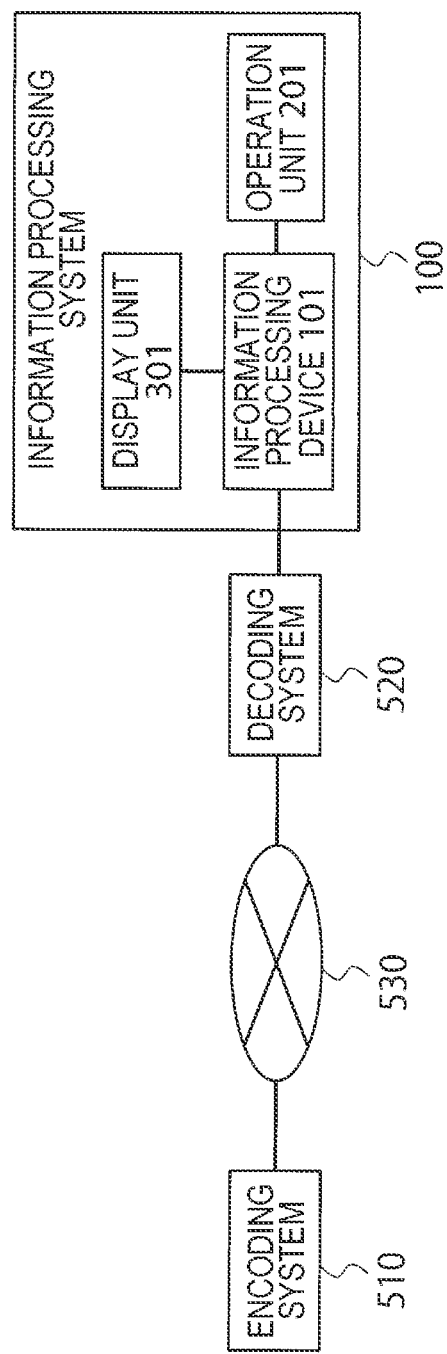
FIG. 26 is a view illustrating an example of a free viewpoint video transmission system according to a third embodiment.

FIG. 26 illustrates an example of a free viewpoint video transmission system according to the third embodiment. The free viewpoint video transmission system includes an encoding system 510, a decoding system 520, and the information processing system 100. The information processing system 100 is the information processing system in FIG. 1 or 18.

In the free viewpoint video transmission system in FIG. 26, three-dimensional modeling of the subject is performed by the encoding system 510, and data related to the three-dimensional model generated by the three-dimensional modeling is transmitted to the decoding system 520 with a low data amount. The data is decoded by the decoding system 520 to acquire three-dimensional model information and the like, and the three-dimensional model information and the like are stored in the information storage unit 10 of the information processing system 100.

The encoding system 510 and the decoding system 520 are connected via a communication network 530. The communication network 530 is a wired, wireless, or mixed network of the wired and the wireless. The communication network 530 may be a local area network (LAN) or a wide area network (WAN) such as the Internet. The communication network 530 may be a network of any standard or protocol. For example, the communication network 530 may be a wireless LAN, a 4G or 5G mobile network, or the like. The communication network 530 may be a communication cable such as a serial cable.

Figure 27:
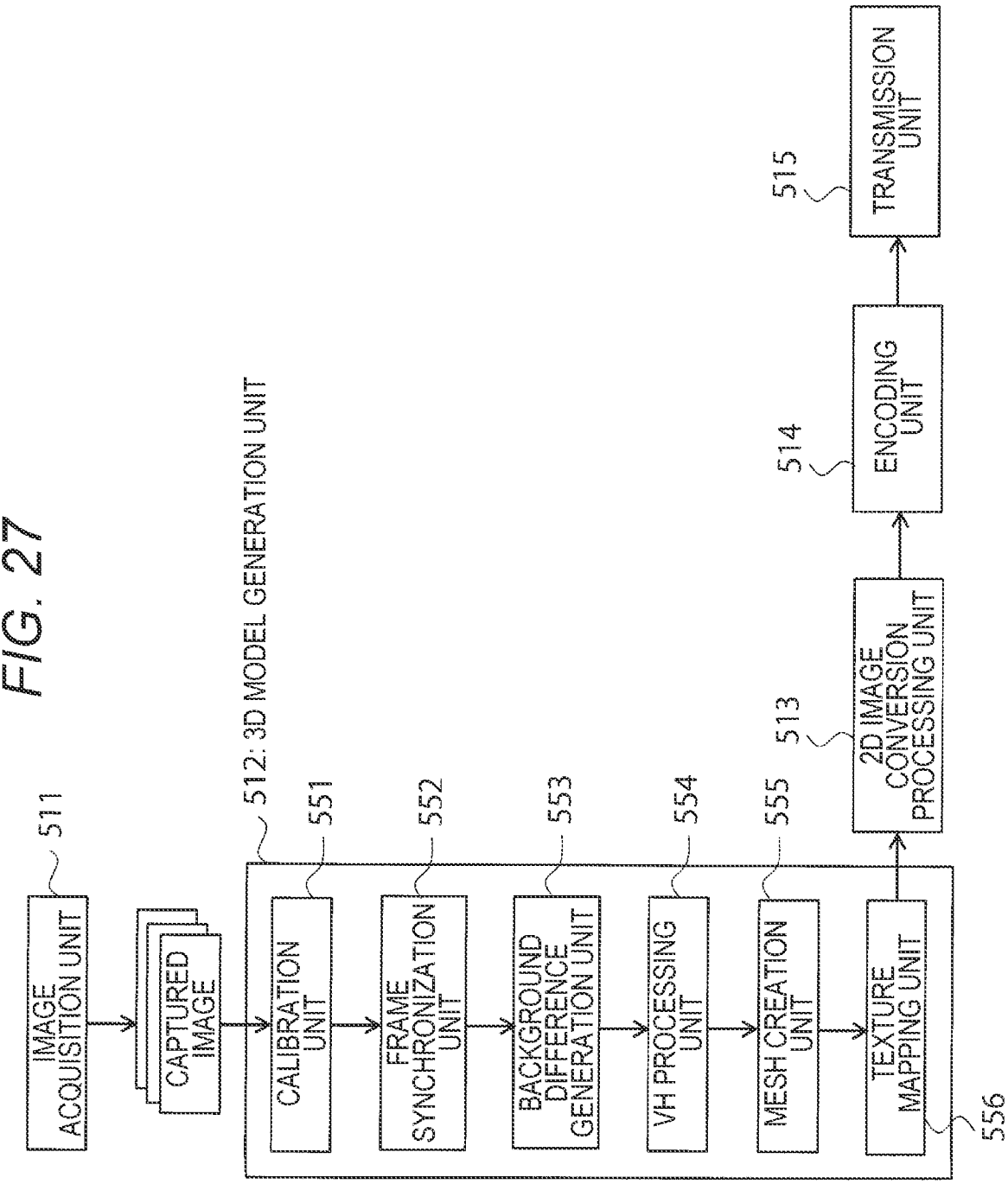
FIG. 27 is a block diagram of an encoding system.

FIG. 27 is a block diagram of the encoding system 510. The encoding system 510 includes an image acquisition unit 511, a three-dimensional model generation unit 512, a two-dimensional image conversion processing unit 513, an encoding unit 514, and a transmission unit 515. The encoding system 510 can be implemented by a hardware configuration similar to that in FIG. 25.

The image acquisition unit 511 images the subject from a plurality of viewpoints and acquires a plurality of captured images.

Figure 28:
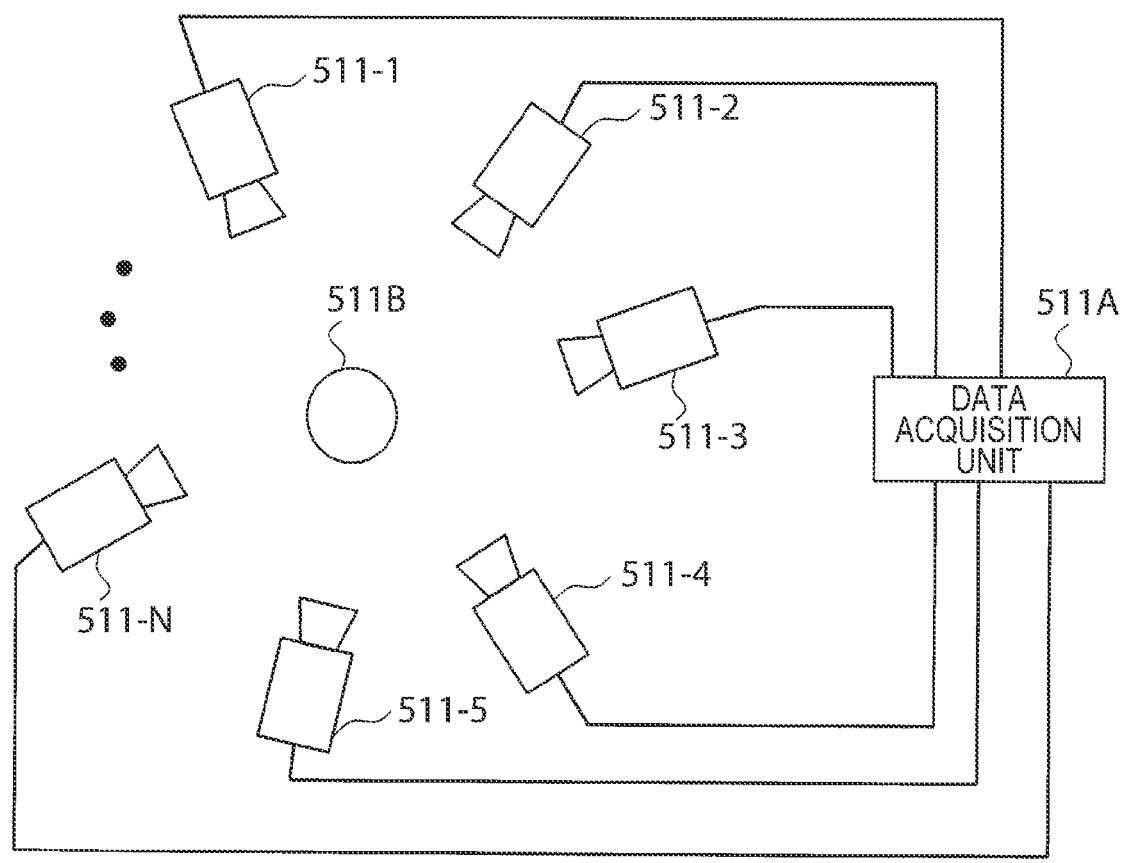
FIG. 28 is a view illustrating a configuration example of an image acquisition unit.

FIG. 28 illustrates a configuration example of the image acquisition unit 511. The image acquisition unit 511 includes a data acquisition unit 511A and a plurality of imaging cameras 511-1 to 511-N corresponding to the plurality of viewpoints. The imaging cameras 511-1 to 511-N are arranged at positions surrounding the periphery of a subject 511B. The imaging cameras 511-1 to 511-N are arranged in an orientation facing the subject 511B. Camera calibration is performed in advance for the imaging cameras 511-1 to 511-N, and camera parameters are acquired. The camera parameters include internal parameters and external parameters as described above. The imaging cameras 511-1 to 511-N image the subject 511B from respective positions and acquire N captured images (RGB images). Some of the imaging cameras may be a stereo camera. A sensor other than the imaging camera, for example, a sensor such as a TOF sensor or LIDAR may be arranged.

The three-dimensional model generation unit 512 generates three-dimensional model information representing a three-dimensional model of the subject on the basis of the plurality of captured images acquired by the image acquisition unit 511. The three-dimensional model generation unit 512 includes a calibration unit 551, a frame synchronization unit 552, a background difference generation unit 553, a VH processing unit 554, a mesh creation unit 555, and a texture mapping unit 556.

The calibration unit 551 corrects the captured images of the plurality of viewpoints using internal parameters of the plurality of imaging cameras.

The frame synchronization unit 552 sets one of the plurality of imaging cameras as a standard camera and sets the rest as reference cameras. The frame of a captured image of the reference camera is synchronized with the frame of a captured image of the standard camera.

The background difference generation unit 553 generates a silhouette image of the subject by the background difference processing using a difference between a foreground image (image of the subject) and a background image with respect to the plurality of captured images. As an example, the silhouette image is represented by binarizing a silhouette indicating a range in which the captured image includes the subject.

The VH processing unit 554 performs modeling of the subject using a plurality of silhouette images and camera parameters. For modeling, a visual hull technique or the like can be used. That is, each silhouette image is reversely projected to an original three-dimensional space, and an intersection of volumes is obtained as a visual hull.

The mesh creation unit 555 creates a plurality of meshes by applying Marching cubes or the like to voxel data of the visual hull. A three-dimensional position of each point (vertex) constituting a mesh and geometry information (geometry) indicating a connection (polygon) of each point are generated as three-dimensional shape data (polygon model). The surface of the polygon may be smoothed by performing smoothing processing on the polygon model.

The texture mapping unit 556 performs texture mapping of superimposing a mesh image on each mesh of the three-dimensional shape data. The three-dimensional shape data after the texture mapping is set as three-dimensional model information representing the three-dimensional model of the subject.

The two-dimensional image conversion processing unit 513 converts the three-dimensional model information into a two-dimensional image. Specifically, perspective projection of the three-dimensional model represented by the three-dimensional model information is performed for every viewpoint on the basis of the camera parameters of the plurality of viewpoints. Therefore, a plurality of two-dimensional images in which the three-dimensional model is projected in a perspective manner from each viewpoint is acquired. Furthermore, depth information is acquired for each of the plurality of two-dimensional images on the basis of the camera parameters of the plurality of viewpoints from these plurality of two-dimensional images, and the acquired depth information is associated with each of the two-dimensional images. By converting the three-dimensional model information into the two-dimensional image in this manner, it is possible to reduce the data amount as compared with the case where the three-dimensional model information is transmitted as it is.

The transmission unit 515 encodes transmission data including the plurality of two-dimensional images and the depth information, the camera parameters of the plurality of viewpoints, and captured images of the plurality of viewpoints, and transmits the encoded transmission data to the decoding system 520. A mode of transmitting, without encoding, all or part of the transmission data is also not excluded. The transmission data may include other information. As a coding technique, for example, a two-dimensional compression technology such as 3D multiview video coding (MVC), MVC, or advanced video coding (AVC) can be used. By encoding the transmission data, it is possible to reduce the data amount to be transmitted. Note that the three-dimensional model information can be encoded as it is and transmitted to the decoding system 520 or the information processing system 100.

Figure 29:
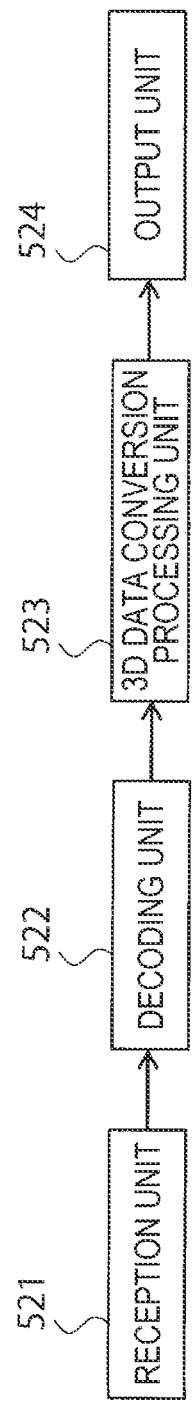
FIG. 29 is a block diagram of a decoding system.

FIG. 29 is a block diagram of the decoding system 520. The decoding system 520 includes a reception unit 521, a decoding unit 522, a three-dimensional data conversion processing unit 523, and an output unit 524. The decoding system 520 can be implemented by a hardware configuration similar to that in FIG. 25. The reception unit 521 receives and supplies, to the decoding unit 522, the transmission data transmitted from the encoding system 510.

The decoding unit 522 decodes the transmission data and acquires a plurality of two-dimensional images and depth information, a plurality of captured images, camera parameters of a plurality of viewpoints, and the like. As a decoding technique, the same two-dimensional compression technology as the encoding on the transmission side can be used.

The three-dimensional data conversion processing unit 523 performs conversion processing of converting the plurality of two-dimensional images into three-dimensional model information representing a three-dimensional model of the subject. For example, modeling by a visual hull or the like is performed using a plurality of two-dimensional images, depth information, and camera parameters.

The output unit 524 provides the three-dimensional model information, the plurality of captured images, the camera parameters, and the like to the information processing device 101. The information processing device 101 of the information processing system 100 stores the three-dimensional model information, the plurality of captured images, the camera parameters, and the like into the information storage unit 10.

Note that the above-described embodiments illustrate examples for embodying the present disclosure, and the present disclosure can be implemented in various other modes. Various modifications, substitutions, omissions, or combinations of them can be made without departing from the gist of the present disclosure, for example. Modes in which such modifications, substitutions, omissions, and the like are made are also included in the invention described in the claims and the equivalent scope thereof, similarly to be included in the scope of the present disclosure.

Furthermore, the effects of the present disclosure described in the present description are merely examples, and other effects may be provided.

Note that the present disclosure can also have the following configurations.

[Item 1]

An information processing device including:
a first display control unit that displays, on a display device, a three-dimensional model of a subject based on a plurality of captured images obtained by imaging the subject from a plurality of viewpoints;
a second display control unit that displays, on the display device, a first captured image on a first viewpoint and a second captured image on a second viewpoint among the plurality of captured images;
a position acquisition unit that acquires position information of a first position included in the subject in the first captured image and acquires position information of a second position included in the subject in the second captured image;
a position calculation unit that calculates a third position included in the three-dimensional model, on the basis of information regarding the first viewpoint and the second viewpoint, position information of the first position, and position information of the second position; and
a third display control unit that displays, on the display device, position information of the third position superimposed on the three-dimensional model.

[Item 2]

The information processing device according to Item 1, in which
the position calculation unit calculates a position at which a straight line to which the first position is projected according to a line-of-sight direction of the first viewpoint and a straight line to which the second position is projected according to a line-of-sight direction of the second viewpoint intersect, and a calculated position is the third position.

[Item 3]

The information processing device according to Item 1 or 2, in which
the position calculation unit calculates the third position on the basis of a principle of triangulation.

[Item 4]

The information processing device according to any one of Items 1 to 3 further including:
an image selection unit that selects, from the plurality of captured images, captured images on two viewpoints closest to a viewpoint of a user viewing the three-dimensional model, in which
the second display control unit displays the first captured image and the second captured image selected by the image selection unit.

[Item 5]

The information processing device according to any one of Items 1 to 4 further including:
an image selection unit that selects the first captured image and the second captured image on the basis of selection information for designating the first captured image and the second captured image, in which
the second display control unit displays the first captured image and the second captured image selected by the image selection unit.

[Item 6]

The information processing device according to any one of Items 1 to 5 further including:
an instruction information acquisition unit that acquires instruction information for instructing enlargement or reduction of at least one of the first captured image and the second captured image, in which the second display control unit enlarges or reduces at least one of the first captured image and the second captured image on the basis of the instruction information.

[Item 7]

The information processing device according to Item 6, in which the position acquisition unit acquires position information of the first position from an operation device of a user in a state where the first captured image is enlarged, and acquires position information of the second position from the operation device in a state where the second captured image is enlarged.

[Item 8]

The information processing device according to any one of Items 1 to 7 further including:

an instruction information acquisition unit that acquires instruction information for instructing on or off of display of at least one of the first captured image and the second captured image, in which the second display control unit switches on or off of display of at least one of the first captured image and the second captured image on the basis of the instruction information.

[Item 9]

The information processing device according to any one of Items 1 to 8, in which the second display control unit displays, on the display device, position information of the first position superimposed on the first captured image, and the second display control unit displays, on the display device, position information of the second position superimposed on the second captured image.

[Item 10]

The information processing device according to any one of Items 1 to 9 further including:

a guide information generation unit that generates guide information including a candidate for the second position on the basis of the information regarding the first viewpoint and the second viewpoint and position information of the first position; and a fourth display control unit that displays, on the display device, the guide information superimposed on the second captured image.

[Item 11]

The information processing device according to Item 10, in which the guide information is an epipolar line.

[Item 12]

The information processing device according to Item 9 further including:

an instruction information acquisition unit that acquires instruction information for instructing movement of position information of the third position, in which the third display control unit moves position information of the third position on the basis of the instruction information, and the second display control unit moves position information of the first position and position information of the second position according to movement of position information of the third position.

[Item 13]

An information processing method including:

displaying, on a display device, a three-dimensional model of a subject based on a plurality of captured images obtained by imaging the subject from a plurality of viewpoints;

displaying, on the display device, a first captured image on a first viewpoint and a second captured image on a second viewpoint among the plurality of captured images;

acquiring position information of a first position included in the subject in the first captured image, and acquiring position information of a second position included in the subject in the second captured image;

calculating a third position included in the three-dimensional model on the basis of information regarding the first viewpoint and the second viewpoint, position information of the first position, and position information of the second position; and displaying, on the display device, position information of the third position superimposed on the three-dimensional model.

[Item 14]

A computer program for causing a computer to execute a step of displaying, on a display device, a three-dimensional model of a subject based on a plurality of captured images obtained by imaging the subject from a plurality of viewpoints, a step of displaying, on the display device, a first captured image on a first viewpoint and a second captured image on a second viewpoint among the plurality of captured images, a step of acquiring position information of a first position included in the subject in the first captured image, and acquiring position information of a second position included in the subject in the second captured image, a step of calculating a third position included in the three-dimensional model on the basis of information regarding the first viewpoint and the second viewpoint, position information of the first position, and position information of the second position, and a step of displaying, on the display device, position information of the third position superimposed on the three-dimensional model.

REFERENCE SIGNS LIST

101 Information processing device
10 Information storage unit
20 Display control unit
30 Interaction detection unit
40 Position storage unit
50 Target point calculation unit (triangulation operation unit)
60 Image selection unit
110, 120 Captured image
21 Model display control unit
22 Image display control unit
23 Target point display control unit
24 Guide information display control unit
31 Operation instruction acquisition unit
32 Position acquisition unit
70 Three-dimensional image
71 Three-dimensional model
71A Glove
71B Cap
72 Mound 73 Pitcher's plate
75, 76 Target point
77 Line segment
80 Guide information calculation unit
91 Baseball player
91A First feature point
91B Second feature point
92A, 92B, 92C, 92D Imaging camera
115, 116 Target point
141, 142 Image plane
143, 144 Two viewpoints (imaging cameras)
145, 146 Position of imaging camera (light source position)
147, 148 Epipole
x1, x2 Position where point X is projected (two-dimensional coordinates)
149 Epipolar plane
151 Epipolar line
400 Computer device
401 CPU
402 Input interface
403 Display device
404 Communication device
405 Main storage device
406 External storage device
407 Bus
510 Encoding system
520 Decoding system
100 Information processing system
511 Image acquisition unit
512 Three-dimensional model generation unit
513 Two-dimensional image conversion processing unit
514 Encoding unit
515 Transmission unit
511A Data acquisition unit
551 Calibration unit
552 Frame synchronization unit
553 Background difference generation unit
554 VH processing unit
555 Mesh creation unit
556 Texture mapping unit
521 Reception unit
522 Decoding unit
522, 523 Three-dimensional data conversion processing unit
524 Output unit

The invention claimed is:

1. An information processing device comprising:
a first display control unit configured to display, on a display device, a three-dimensional model of a subject based on a plurality of captured images obtained by imaging the subject from a plurality of viewpoints;
a second display control unit configured to display, on the display device, a first captured image on a first viewpoint and a second captured image on a second viewpoint among the plurality of captured images;
a position acquisition unit configured to acquire position information of a first position included in the subject in the first captured image and acquires position information of a second position included in the subject in the second captured image;
a position calculation unit configured to calculate a third position included in the three-dimensional model, on a basis of information regarding the first viewpoint and the second viewpoint, position information of the first position, and position information of the second position; and
a third display control unit configured to display, on the display device, position information of the third position superimposed on the three-dimensional model,
wherein the first display control unit, the second display control unit, the position acquisition unit, the position calculation unit, and the third display control unit are each implemented via at least one processor.

2. The information processing device according to claim 1, wherein
the position calculation unit calculates a position at which a straight line to which the first position is projected according to a line-of-sight direction of the first viewpoint and a straight line to which the second position is projected according to a line-of-sight direction of the second viewpoint intersect, and a calculated position is the third position.

3. The information processing device according to claim 2, wherein
the position calculation unit calculates the third position on a basis of a principle of triangulation.

4. The information processing device according to claim 1 further comprising:
an image selection unit configured to select, from the plurality of captured images, captured images on two viewpoints closest to a viewpoint of a user viewing the three-dimensional model, wherein
the second display control unit displays the first captured image and the second captured image selected by the image selection unit, and
the image selection unit is implemented via at least one processor.

5. The information processing device according to claim 1 further comprising:
an image selection unit configured to select the first captured image and the second captured image on a basis of selection information for designating the first captured image and the second captured image, wherein
the second display control unit displays the first captured image and the second captured image selected by the image selection unit, and
the image selection unit is implemented via at least one processor.

6. The information processing device according to claim 1 further comprising:
an instruction information acquisition unit configured to acquire instruction information for instructing enlargement or reduction of at least one of the first captured image and the second captured image, wherein
the second display control unit enlarges or reduces at least one of the first captured image and the second captured image on a basis of the instruction information, and
the instruction information acquisition unit is implemented via at least one processor.

7. The information processing device according to claim 6, wherein
the position acquisition unit acquires position information of the first position from an operation device of a user in a state where the first captured image is enlarged, and acquires position information of the second position from the operation device in a state where the second captured image is enlarged.

8. The information processing device according to claim 1 further comprising:
an instruction information acquisition unit configured to acquire instruction information for instructing on or off of display of at least one of the first captured image and the second captured image, wherein the second display control unit switches on or off of display of at least one of the first captured image and the second captured image on a basis of the instruction information, and the instruction information acquisition unit is implemented via at least one processor.

9. The information processing device according to claim 1, wherein the second display control unit displays, on the display device, position information of the first position superimposed on the first captured image, and the second display control unit displays, on the display device, position information of the second position superimposed on the second captured image.

10. The information processing device according to claim 9 further comprising:

an instruction information acquisition unit configured to acquire instruction information for instructing movement of position information of the third position, wherein the third display control unit moves position information of the third position on a basis of the instruction information, the second display control unit moves position information of the first position and position information of the second position according to movement of position information of the third position, and the instruction information acquisition unit is implemented via at least one processor.

11. The information processing device according to claim 1 further comprising:

a guide information generation unit configured to generate guide information including a candidate for the second position on a basis of the information regarding the first viewpoint and the second viewpoint and position information of the first position; and a fourth display control unit configured to display, on the display device, the guide information superimposed on the second captured image, wherein the guide information generation unit and the fourth display control unit are each implemented via at least one processor.

12. The information processing device according to claim 11, wherein the guide information is an epipolar line.

13. An information processing method comprising:

displaying, on a display device, a three-dimensional model of a subject based on a plurality of captured images obtained by imaging the subject from a plurality of viewpoints;

displaying, on the display device, a first captured image on a first viewpoint and a second captured image on a second viewpoint among the plurality of captured images;

acquiring position information of a first position included in the subject in the first captured image, and acquiring position information of a second position included in the subject in the second captured image;

calculating a third position included in the three-dimensional model on a basis of information regarding the first viewpoint and the second viewpoint, position information of the first position, and position information of the second position; and displaying, on the display device, position information of the third position superimposed on the three-dimensional model.

14. A non-transitory computer-readable medium having embodied thereon a computer program, which when executed by a computer causes the computer to execute a method, the method comprising:

displaying, on a display device, a three-dimensional model of a subject based on a plurality of captured images obtained by imaging the subject from a plurality of viewpoints, displaying, on the display device, a first captured image on a first viewpoint and a second captured image on a second viewpoint among the plurality of captured images, acquiring position information of a first position included in the subject in the first captured image, and acquiring position information of a second position included in the subject in the second captured image, calculating a third position included in the three-dimensional model on a basis of information regarding the first viewpoint and the second viewpoint, position information of the first position, and position information of the second position, and displaying, on the display device, position information of the third position superimposed on the three-dimensional model.

* * * * *